United States Patent
Munetsugu et al.

(10) Patent No.: US 9,106,962 B2
(45) Date of Patent: Aug. 11, 2015

(54) CONTENT PLAYBACK DEVICE, CONTENT PLAYBACK METHOD, CONTENT PLAYBACK PROGRAM, AND CONTENT PROVIDING SYSTEM

(75) Inventors: Toshihiko Munetsugu, Osaka (JP); Yuka Ozawa, Osaka (JP); Takuji Hiramoto, Osaka (JP); Toru Kawaguchi, Osaka (JP); Hiroshi Yahata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 262 days.

(21) Appl. No.: 13/551,958

(22) Filed: Jul. 18, 2012

(65) Prior Publication Data
US 2013/0024898 A1    Jan. 24, 2013

Related U.S. Application Data

(60) Provisional application No. 61/510,642, filed on Jul. 22, 2011.

(51) Int. Cl.
*H04N 5/445* (2011.01)
*H04N 21/472* (2011.01)
*H04N 7/18* (2006.01)
(Continued)

(52) U.S. Cl.
CPC ......... *H04N 21/47217* (2013.01); *H04N 7/181* (2013.01); *H04N 21/2387* (2013.01); *H04N 21/23439* (2013.01); *H04N 21/26258* (2013.01); *H04N 21/6125* (2013.01);
(Continued)

(58) Field of Classification Search
CPC combination set(s) only.
See application file for complete search history.

(56) References Cited

U.S. PATENT DOCUMENTS

2002/0021353 A1   2/2002   DeNies
2006/0061682 A1*  3/2006   Bradley et al. ............... 348/441
(Continued)

FOREIGN PATENT DOCUMENTS

EP   2 437 513 A1   4/2012
JP   2004-234111    8/2004
(Continued)

OTHER PUBLICATIONS

International Search Report issued Oct. 23, 2012 in corresponding International Application No. PCT/JP2012/004563.
(Continued)

*Primary Examiner* — Chenea Smith
(74) *Attorney, Agent, or Firm* — Wenderoth, Lind & Ponack, L.L.P.

(57) ABSTRACT

To provide a content playback device capable of, when playing back a content distributed in a streaming format via a network whose view mode is selectable among a plurality of view modes, presenting to a user the switchability between the view modes, thereby to improve the user's convenience. The content playback device includes a reception unit that receives, from the content distribution system, control information indicating a plurality of view modes selectable for viewing the video content, a presentation unit that presents, to a user, the view modes as options of a view mode for viewing the video content, an input reception unit that receives an input selecting one view mode among the view modes from the user; and a request unit that requests the content distribution system to distribute the video content in the streaming format, by transmitting information indicating the selected view mode to the content distribution system.

9 Claims, 16 Drawing Sheets

Content providing system

(51) Int. Cl.

| | | |
|---|---|---|
| *H04N 21/6587* | (2011.01) | |
| *H04N 21/84* | (2011.01) | |
| *H04N 21/2343* | (2011.01) | |
| *H04N 21/2387* | (2011.01) | |
| *H04N 21/262* | (2011.01) | |
| *H04N 21/61* | (2011.01) | |
| *H04N 21/81* | (2011.01) | |

(52) U.S. Cl.
CPC ........ *H04N 21/6587* (2013.01); *H04N 21/816* (2013.01); *H04N 21/84* (2013.01)

(56) References Cited

U.S. PATENT DOCUMENTS

| | | |
|---|---|---|
| 2006/0221178 A1 | 10/2006 | Yun et al. |
| 2007/0101370 A1 | 5/2007 | Calderwood |
| 2007/0157240 A1* | 7/2007 | Walker ............................ 725/46 |
| 2008/0027953 A1 | 1/2008 | Morita et al. |
| 2008/0195664 A1* | 8/2008 | Maharajh et al. .......... 707/104.1 |
| 2008/0301749 A1* | 12/2008 | Harrar et al. ................. 725/131 |
| 2010/0034515 A1* | 2/2010 | Asai ................................ 386/95 |
| 2010/0192177 A1* | 7/2010 | Thomas et al. ................. 725/34 |
| 2010/0223407 A1 | 9/2010 | Dong et al. |
| 2011/0158606 A1 | 6/2011 | Lin et al. |
| 2012/0026287 A1 | 2/2012 | Tsukagoshi |
| 2012/0079606 A1* | 3/2012 | Evans et al. ..................... 726/28 |

FOREIGN PATENT DOCUMENTS

| | | |
|---|---|---|
| JP | 2006-13847 | 1/2006 |
| JP | 2011-120195 | 6/2011 |
| JP | 2 437 513 A1 | 4/2012 |
| JP | 2012-80309 | 4/2012 |
| WO | 2011/151959 | 12/2011 |

OTHER PUBLICATIONS

"IPTV Standard, VOD Specifications, IPTVFJ STD-0002 Revision 1.1", IPTV Forum Japan (General Incorporated Associations), Jul. 21, 2011, pp. 1-111.

"Streaming Functional Specifications in Digital Television Network Functional Specifications, Codec Part, Revision 1.2", Digital Television Information Study Group, Dec. 21, 2010, pp. 1-61 (with partial English translation of pp. 38-42 and its verification).

Partial supplementary European Search Report issued Dec. 17, 2014 in corresponding European Application No. EP12817669.0.

Amit Agarwal, "Play YouTube Videos in HD Quality when using Full Screen Mode", online, May 23, 2011, pp. 1-3, XP002730650, Retrieved from the Internet: URL:https://web.archive.org/web/20110523034445/http://www.labnol.org/internet/youtube-video-hdplayback-quality/13873/, [retrieved on Oct. 2, 2014].

Extended European Search Report issued Mar. 31, 2015 in corresponding European Application No. 12817669.0.

Anonymous, "*Study text of ISO/IEC DIS 23001-6 Dynamic Adaptive Streaming over HTTP*", IEEE, LIS, Sophia Antipolis Cedex, France, No. N11930, Apr. 19, 2011, XP030018423, ISSN: 0000-0001, figures 1, 2, pp. 10, 62, 86-87.

Waciar Zia et al., "*DASH Evaluation Experiment #3: Enhancement to Representation Description (ERD)*", 94. MPEG Meeting, Oct. 11, 2010-Oct. 15, 2010, Guangzhou, China, (Motion Picture Expert Group or ISO/IEC JTC1/SC29/WG11), No. M18013, Oct. 28, 2010, XP030046603, pp. 1-2.

Engin Kurutepe et al., "*A Standards-Based, Flexible, End-to-End Multi-View Video Streaming Architecture*", Packet Video 2007, IEEE, PI, Nov. 1, 2007, XP031170627, DOI: 10.1109/Packet.2007.4397054, ISBN: 978-1-4244-0980-8, pp. 302-307.

\* cited by examiner

Content providing system

FIG. 3

| Content name | Content ID | View mode | Playback control informaiton URL | Return URL |
|---|---|---|---|---|
| Content A | C01 | 2D | http://controlserver.com/01.cpc | http://portal.com/index.html |
| Content B | C02 | stereoscopic_MVC | http://controlserver.com/02.cpc | http://portal.com/index.html |
| ... | ... | | ... | ... |

FIG. 4

| User ID | Content ID | Device ID | Last view mode | The number of seconds on viewing |
|---|---|---|---|---|
| U01 | C01 | D01 | stereoscopic_MVC | 3600 |
| U01 | — | D02 | — | — |
| ... | ... | ... | ... | ... |
| U02 | C08 | D11 | 2D | 4000 |
| ... | ... | ... | ... | ... |

FIG. 6

| Item | | | | Explanation | Count |
|---|---|---|---|---|---|
| <eri> | | | | Entire ERI document | 1 |
| | <header> | | | | |
| | | <date> | | Date of creation | 1 |
| | | <time> | | Time of creation | 1 |
| | | <encryption> | | Identification of encrypted or non-encrypted content | 1 |
| | <startup> | | | Entry resource information of target content | 1 |
| | | <content_title> | | Title name of target content | 1 |
| | | <content_abstract> | | Abstract of target content | 0..1 |
| | | <service_provider_name> | | Distributor name of target content | 0..1 |
| | | <duration> | | Duration of target content | 0..1 |
| | | <start> | | Reference destination of target content body | 1 |
| | <content_chapter_info> | | | Chapter information | 0..1 |
| | | <chapter> | | | 1..99 |
| | | | @number | Chapter number | 1 |
| | | | <chapter_point> | Start point of chapter (Relative time from start of program) | 1 |
| | | | <chapter_title> | Title name of chapter | 0..1 |
| | | | <start_3d2d> | 3D/2D structure of content at chapter start point | 0..1 |

FIG. 7

| Item | | | Explanation | Count |
|---|---|---|---|---|
| <es_info> | | | ES information | 1 |
| | <video_info> | | Video ES information | 1 |
| | | @resolution | Resolution | 1 |
| | | @coding | Coding method | 1 |
| | <audio_info> | | Information of audio ES (per audio channel) | 0..4 |
| | | @es_number | Number of audio ES | 1 |
| | | @mode | Audio mode | 1 |
| | | <audio_title> | Title name of audio channel | 1 |
| | <caption_info> | | Information of subtitle ES (per language) | 0..2 |
| | | @number | Subtitle number | 1 |
| | | @language | Subtitle language | 1 |
| | <stereoscopic_info> | | 3D information | 0..1 |
| | <stereoscopic_format> | | 3D transmission method | 1 |
| | <structure_3d2d> | | 2D/3D structure of content | 1 |
| <available_play_mode> | | | Description of available view modes for user 2D: Viewable in 2D stereoscopic_MVC: Viewable in 3D | 0..99 |
| <default_play_mode> | | | Initial value indicating view mode at playback start 2D: Start playback in 2D stereoscopic_MVC: Start playback in 3D | 1 |

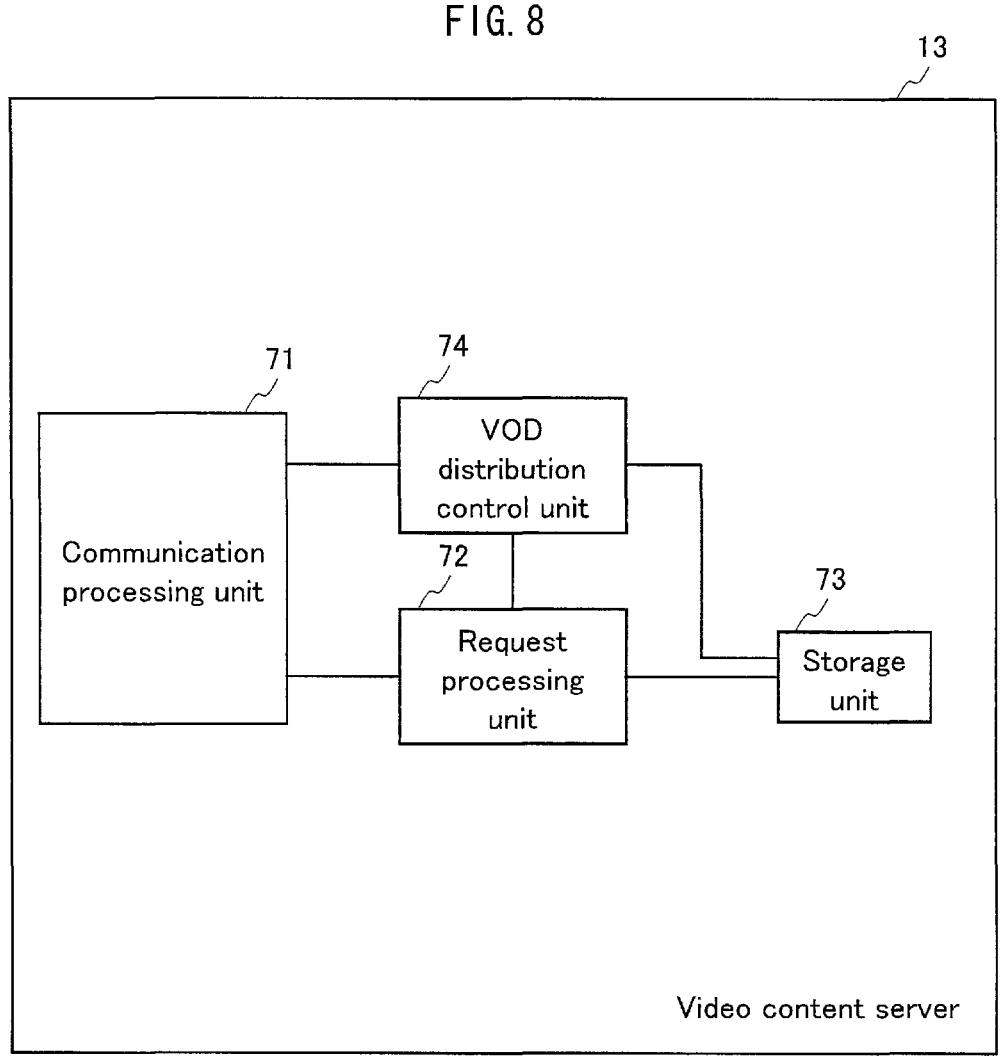

FIG. 16

| Item | Explanation | Count |
|---|---|---|
| <available_play_mode> | Description of available view modes for user<br>View1: Viewable in view point 1<br>View2: Viewable in view point 2 | 0..99 |

FIG. 17

| Item | Explanation | Count |
|---|---|---|
| <available_play_mode> | Description of available view modes for user<br>SD: Viewable in SD resolution<br>HD: Viewable in HD resolution<br>4K: Viewable in 4K resolution<br>QVGA: Viewable in QVGA resolution | 0..99 |

CONTENT PLAYBACK DEVICE, CONTENT PLAYBACK METHOD, CONTENT PLAYBACK PROGRAM, AND CONTENT PROVIDING SYSTEM

CROSS REFERENCE TO RELATED APPLICATION

This application claims benefit to the U.S. provisional Application 61/510,642, filed on Jul. 22, 2011.

TECHNICAL FIELD

The present disclosure relates to an art of playing back a content while receiving the content in a streaming format via a network, and in particular to switching between view modes during playback of the content.

DESCRIPTION OF THE RELATED ART

In recent years, distribution of video contents in the streaming format via the IPTV (Internet Protocol Tele-Vision) has been prevailed. According to this distribution in the streaming format, the case increases where, in addition to a 2D content that has been conventionally distributed, a 3D content that is identical in matter to the 2D content but differs in view mode from the 2D content.

Here, the IPTV defines that a plurality of contents, which differ in view mode from each other such as described above, are not associated with each other, and are each treated as an individual separate content. A playback device does not have information indicating whether or not a plurality of view modes (such as 2D and 3D) are available for viewing a content (see Non-Patent Literatures 1 and 2).

CITATION LIST

Non-Patent Literature

[Non-Patent Literature 1]
IPTV Forum Japan (General Incorporated Associations), Apr. 16, 2012, "IPTV Standards, VOD Specifications, IPTVFJ STD-0002 Revision 1.2"
[Non-Patent Literature 2]
Digital Television Information Study Group, Dec. 21, 2010, "Streaming Functional Specifications in Digital Television Network Functional Specifications, Codec Part, Revision 1.2"

SUMMARY

By the way, there is considered a case where, during playback of a content in a certain view mode in a playback device, a user hopes to switch from the certain view mode to another view mode. For example, there is a case where though a user has started viewing a content wearing 3D glasses in the 3D view mode, the user hopes to switch from the 3D view mode to the 2D view mode because of hoping to view the content together with another user who does not have 3D glasses. Also for example, there is a case where though a user has started viewing a content in the 2D view mode, the user hopes to switch from the 2D view mode to the 3D view mode because of hoping to view the content with a stereoscopic effect.

However, a playback device does not have information indicating whether or not a plurality of view modes are available for viewing a content, as described above. This causes a problem that the playback device cannot present to a user the switchability between view modes to provide the user with an opportunity to switch between the view modes.

One non-limiting and exemplary embodiment provides a content playback device capable of, when playing back a content distributed in the streaming format via a network whose view mode is selectable among a plurality of view modes, presenting to a user the switchability between the view modes to provide the user with an opportunity to switch between the view modes, thereby to improve the user's convenience.

In one general aspect, the techniques disclosed here feature: a content playback device that plays back a video content while receiving the video content in a streaming format from a content distribution system that is connected therewith via a network, the content playback device comprising: a reception unit operable to receive, from the content distribution system, control information indicating a plurality of view modes selectable for viewing the video content; a presentation unit operable to present, to a user of the content playback device, the view modes as options of a view mode for viewing the video content; an input reception unit operable to receive an input selecting one view mode among the view modes from the user; and a request unit operable to request the content distribution system to distribute the video content in the streaming format, by transmitting information indicating the selected view mode to the content distribution system.

With the above structure, the content playback device relating to an exemplary embodiment of the present invention presents to a user the switchability between view modes to provide the user with an opportunity to switch between the view modes, thereby to improve the user's convenience.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 3 shows an example of a content management information table.

FIG. 4 shows an example of a user management information table.

FIG. 6 shows the structure of playback control information.

FIG. 7 shows the structure of the playback control information, continuing from FIG. 6.

FIG. 8 is a block diagram showing the structure of a video content server.

FIG. 16 shows an element "available_play_mode" relating to a modification example of the present invention.

FIG. 17 shows an element "available_play_mode" relating to a modification example of the present invention.

DETAILED DESCRIPTION

1. Outline

Figure 1:
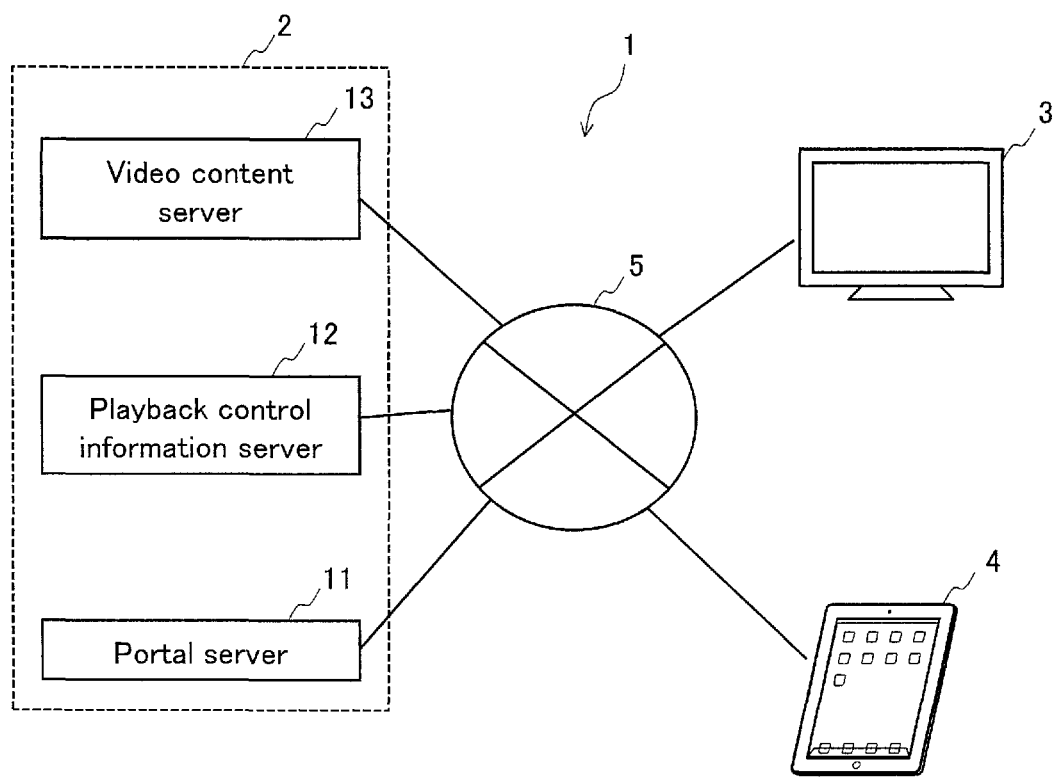
FIG. 1 shows the structure of a content providing system relating to an embodiment of the present invention.

FIG. 1 shows the structure of a content providing system 1 relating to an embodiment of the present invention.

The content providing system 1 includes, as shown in FIG. 1, a content distribution system 2, a playback device 3, and a playback device 4 that are connected with one another via a network 5. The content distribution system 2 distributes a content, playback control information necessary for playing back the content, and so on. The playback devices 3 and 4 each receive and play back the content.

The content distribution system 2 includes a portal server 11, a playback control information server 12, and a video content server 13. The portal server 11 provides a content list of contents to be distributed and a URL (Uniform Resource Locator) for acquiring playback control information corresponding to each content. The playback control information server 12 distributes the playback control information. The video content server 13 distributes the content. For the purpose of convenience of description, the number of each of portal servers, playback control information servers, and video content servers is only one in the present embodiment. However, the actual number of each of these servers is one or more.

In order to receive a content, the playback device 3 firstly requests the portal server 11 to transmit a content list document of contents that are to be distributed in the content providing system 1. The portal server 11 transmits the content list document to the playback device 3.

Upon receiving the content list document, the playback device 3 displays the received content list document on a display for presentation to the user. The user makes an input on the playback device 3 to select a content that the user hopes to play back (hereinafter, "playback target content").

The playback device 3 reads, from the content list document, a URL for accessing a playback control information server corresponding to the playback target content (the playback control information server 12 in the present embodiment). The playback device 3 accesses the read URL to request for transmission of playback control information.

Here, a plurality of view modes selectable for viewing the playback target content have written in the playback control information. The "view mode" for viewing the content indicates a visual configuration for visually representing the content. Also, in general, the term "view" equivalent to the term "look and listen" is more limited in meaning than only the term "look". In the present Description and Claims, a case is also included where the term "view" is used in meaning as the term "look", and is accordingly the term "view" is used more broadly than general usage.

With reference to the playback control information, the playback device 3 presents, on the display, all of the view modes written in the playback control information, as options of a view mode for viewing the video content. The playback device 3 prompts the user to select one among the view modes. This allows the user of the playback device 3 to recognize, in addition to a view mode the user has expected for viewing the playback target content, other view mode that is different from the expected view mode, and thereby leads to the improvement in the user's convenience. The following describes the embodiment of the present invention in further detail.

2. Structure

<2-1. Portal Server 11>

The portal server 11 is a WEB server that provides a portal service that is a portal for receiving content distribution, and provides an HTML (HyperText Markup Language) document, a BML (Broadcast Markup Language) document, and the like.

Figure 2:
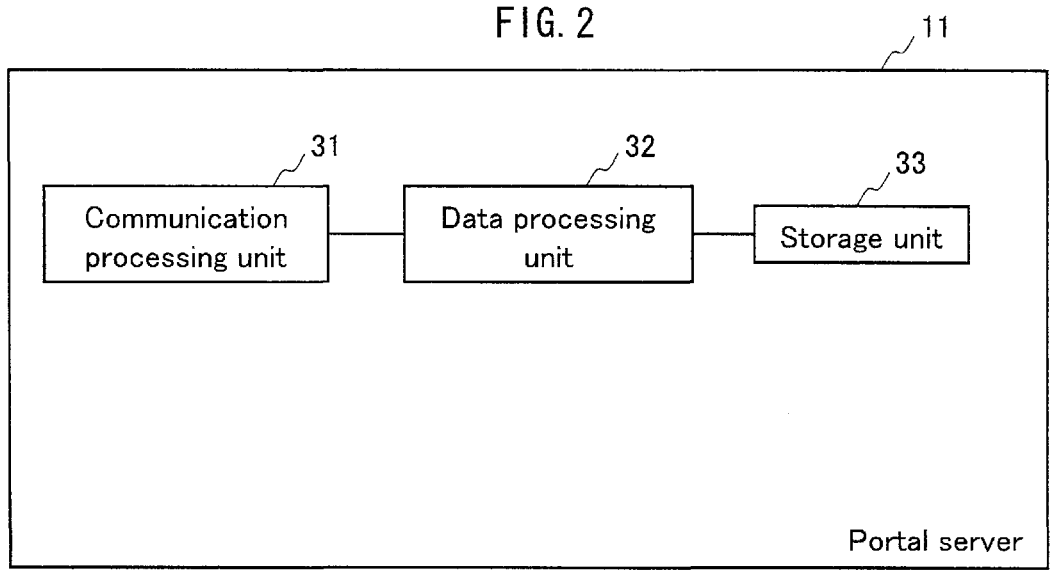
FIG. 2 is a block diagram showing the structure of a portal server.

FIG. 2 is a block diagram showing the structure of the portal server 11.

The portal server 11 includes, as shown in FIG. 2, a communication processing unit 31, a data processing unit 32, and a storage unit 33. The portal server 11 also includes a processor and a memory. The functions of the data processing unit 32 are realized by the processor executing a program stored in the memory.

The communication processing unit 31 is composed of a communication LSI. The communication processing unit 31 transmits and receives data via the network 5.

The storage unit 33 is composed of a non-volatile memory. The storage unit 33 stores therein content management information that is management information relating to each of contents to be distributed by the content distribution system 2 and user management information.

The data processing unit 32 has a function of transmitting content list document and a function of recording user management information.

The function of transmitting content list document is a function of receiving a request for content list transmission, and transmitting a content list document as a response to the received request. The request for content list transmission is generated with use of the content management information and the user management information.

Also, the function of recording user management information is a function of recording and updating user management information that is information relating to respective users of the playback devices 3 and 4, and the like.

<Data Structure>

The following describes the data structure of each of the content management information, the content list document, and the user management information.

<Content Management Information>

Content management information is management information relating to each of contents to be distributed by the content distribution system 2, and is stored beforehand in the storage unit 33.

FIG. 3 shows an example of a content management information table that is a list of pieces of content management information.

The pieces of content management information (shown in rows in the content management information table) one-to-one correspond to the contents to be distributed.

Each of the pieces of content management information is composed of a content name, a content ID, a view mode, a playback control information URL, and a return URL.

The content name is a name of a corresponding content.

The content ID is identification information identifying the content.

The view mode represents a default value indicating a default view mode available for viewing the content in a receiver of the content (playback device 3 or 4). In the case where the content is distributed so as to be viewable as a 2D video in the receiver, a value "2D" is written in the view mode. In the case where the content is distributed so as to be viewable as a 3D video in the receiver, a value "stereoscopic_MVC" is written in the view mode.

The playback control information URL is a URL indicating a resource that provides playback control information necessary for receiving the content for playback.

The return URL is a parameter representing a URL of an HTML document to be displayed by the playback device 3 or 4 after playback of the content.

<User Management Information>

The user management information is information relating to users to which the content distribution system 2 distributes contents. The user management information is generated at a time prior to content distribution, such as at a time of conclusion of the contract of content distribution between a content distributer and each of the users. Also, when the data processing unit 32 receives a content playback stop notification from the playback device 3 or 4, the user management information is updated so as to reflect information contained in the received content playback stop notification.

FIG. 4 shows an example of a user management information table that is a list of pieces of user management information.

Each of the pieces of user management information is composed of a user ID, a content ID, a device ID, a last view mode, and the number of seconds on viewing.

The user ID is information identifying a user who hopes distribution of a content. The user ID is allocated uniquely to each user by the content distributer, at a time of conclusion of the contract of content distribution for example. The user ID is, for example, a customer number. Note that there is a case where a plurality of pieces of user management information correspond to the same user, such as a case where one user owns a plurality of devices.

The content ID is identification information identifying each content.

The device ID is identification information uniquely identifying a playback device to be used by each user. The device ID is allocated uniquely to each device by the content distributer upon request from the user, at a time of conclusion of the contract of content distribution for example.

The last view mode is information indicating a view mode in which the content has been lastly viewed. In the present embodiment, in the last view mode, the value "2D" or "stereoscopic_MVC" is written. Note that in the case where the content has not ever been viewed by the playback device, no value is written in the last view mode.

The number of seconds on viewing is information indicating the number of seconds while the content has been viewed from the beginning of the content until pause of the viewing. Note that in the case where the content has not ever been viewed by the playback device, a value of 0 is written as the number of seconds on viewing.

<Content List Document>

The content list document is in the form of an HTML document, and has written therein an "a" tag in a format shown below (hereinafter, "content tag") for each content to be distributed by the content distribution system 2.

<a href=MetaFileURL?Return=ReturnURL[&PlayPos=PlayPosition]&PlayMode=2D3D[&LID=LicenseID]>NAME</a>

Here, in "NAME" of anchor texts of the "a" tag, a content name of the content is written. Specifically, a content name contained in a piece of content management information corresponding to the content is written.

Here, a parameter "MetaFileURL" is a URL indicating a resource that provides playback control information necessary for receiving the content. Specifically, a playback control information URL contained in the piece of content management information is written.

A parameter "Return" represents a URL of an HTML document to be displayed after finishing the playback of the content. In "ReturnURL", a value of the parameter "Return" is written. Specifically, a return URL contained in the piece of content management information is written.

A parameter "PlayPos" represents a playback start position on the content. In "PlayPosition", the number of seconds elapsed from the beginning of the content is written, as a value of the parameter "PlayPos". For example, in the case where viewing of the content is paused, the number of seconds on viewing contained in a piece of user management information corresponding to a user who has viewed the content is written. A parameter surrounded by a bracket "[ ]" can be omitted. In the above content tag, in the case where the content is played back from the beginning, the parameter "PlayPos" is omitted.

A parameter "PlayMode" represents a view mode for viewing the content. In "2D3D", a view mode contained in a piece of content management information is basically written, as a value of the parameter "PlayMode". Note that, in the case where a content ID contained in the piece of content management information matches a content ID contained in the piece of user management information and a last view mode corresponding to the content ID is contained in the piece of user management information, the last view mode written in the piece of user management information is written in the "PlayMode" instead of the view mode contained in the content management information.

A parameter "LID" represents an ID of a license for use in playing back the content. In "LicenseID", the ID of the license is written. The "LID" is specifically used for charging on the content, for example. In the present embodiment, no description is given on charging.

<2-2. Playback Control Information Server 12>

The playback control information server 12 is a server that transmits playback control metafile upon request.

Figure 5:
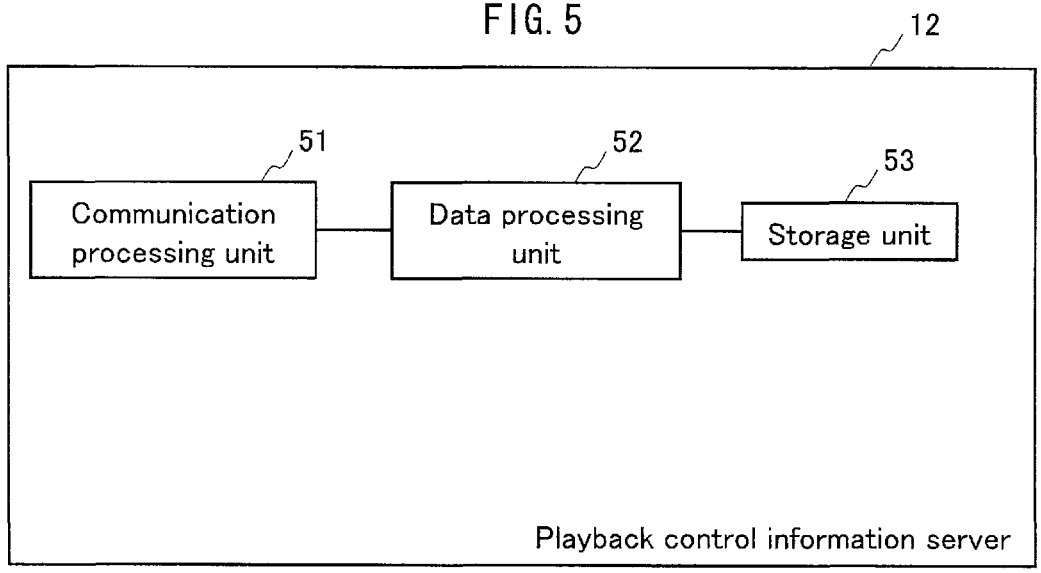
FIG. 5 is a block diagram showing the structure of a playback control information server.

FIG. 5 is a block diagram showing the structure of the playback control information server 12.

The playback control information server 12 includes, as shown in FIG. 5, a communication processing unit 51, a data processing unit 52, and a storage unit 53. The playback control information server 12 also includes a processor and a memory. The functions of the data processing unit 52 are realized by the processor executing a program stored in the memory.

The communication processing unit 51 is composed of a communication LSI. The communication processing unit 51 transmits and receives data via the network 5.

The storage unit 53 is composed of a non-volatile memory. The storage unit 53 stores therein a piece of playback control information corresponding to each content that is to be distributed by the content distribution system 2. A playback control information URL to be accessed for acquiring the piece of playback control information is written as a MetaFileURL in the content list document to be transmitted by the portal server 11.

The data processing unit 52 transmits the piece of playback control information, which has been requested for transmission by access to the MetaFileURL written in the content list document, to a device that has requested for transmission of the piece of playback control information. The data processing unit 52 transmits the piece of playback control information in the format of a playback control metafile that contains this piece of playback control information, LLI (License Link Information), and NCI (Network content Control Information).

<Data Structure>

FIG. 6 and FIG. 7 show the structure of playback control information. FIG. 7 continues from FIG. 6.

The playback control information is obtained by extending ERI (Entry Resource Information) of playback control metafile disclosed in "Streaming Functional Specifications in Digital Television Network Functional Specifications, Codec Part, Revision 1.2" published by the Digital Television Information Study Group in Dec. 21, 2010 (Patent Literature 2). Accordingly, description of items contained in the ERI are omitted here, excepting a particular case.

In the present embodiment, playback control information results from extension by additionally containing an element "available_play_mode" and/or an element "default_play_mode" in ERI.

In the element "available_play_mode", all of selectable view modes for viewing a content are written. In the element "available_play_mode", at least one of the value "2D" and the value "stereoscopic_MVC" is written. The value "2D" indicates that the content is viewable as a 2D video. The value "stereoscopic_MVC" indicates that the content is viewable as a 3D video in the MVC (Multi View Coding) method.

The playback device receives the playback control information, and refers to the element "available_play_mode", thereby to present one or more selectable view modes to the user beforehand.

According to the above MVC method, the playback device codes a multi-view video as one base view and one or more dependent views. According to this MVC method, the playback device codes the dependent views by referring frames contained in the base view (by performing inter-view prediction). This enables efficient compression compared to the case where the base view and the dependent views are treated independently.

The element "default_play_mode" is information to be used by the playback device, which has received the playback control information, for designating which one of a 2D video and a 3D video is to be selected by default. This element "default_play_mode" may be additionally contained in the ERI. However, in the present embodiment, the element "default_play_mode" is not additionally contained in the ERI. The case where the element "default_play_mode" is additionally contained in the ERI is described later as a modification example.

Note that a reference destination of the body of the content is written in the element "start" contained in the ERI, a request destination URL of an AV resource having a character string of 1024 bytes or less including a scheme. The scheme is "rtsp://" or "http://". Specifically, the reference destination is written such as "http://videoserver.com/AVData/0001.m2ts".

<2-3. Video Content Server 13>

The video content server 13 is a server that distributes a video content in the streaming format.

FIG. 8 is a block diagram showing the structure of the video content server 13.

The video content server 13 includes, as shown in FIG. 8, a communication processing unit 71, a request processing unit 72, a storage unit 73, a VOD (Video On Demand) distribution control unit 74. The video content server 13 also includes a processor and a memory. The respective functions of the request processing unit 72 and the VOD distribution control unit 74 are realized by the processor executing a program stored in the memory.

The communication processing unit 71 is composed of a communication LSI. The communication processing unit 71 transmits and receives data via the network 5.

The storage unit 73 is composed of a non-volatile memory. The storage unit 73 stores therein the body of a content to be distributed.

The request processing unit 72 has a function of, upon reception of a request for content distribution, instructing the VOD distribution control unit 74 to distribute the requested content (hereinafter, "distribution instruction function").

The request for content distribution is made by issuing an HTTP (HyperText Transfer Protocol)-GET request. Note that the HTTP is defined in the RFC2616. The HTTP-GET request is issued in the following format, for example.

"GET http://videoserver.com/AVData/0001.m2ts HTTP/1.1

Host: videoserver.com

Date: Wed Jul. 20 15:00:00 2011 GMT

User-Agent: IP Broadcast Receiver

Connection: Keep-Alive

X-Request-Play-Mode: 3D

X-TimeSeekRange: npt-time=00:60:00-"

In the URL of the HTTP-GET request, a URL for acquiring the content is written. In the above example, the URL for acquiring the content is "http://videoserver.com/AVData/0001.m2ts".

In "Host", a host name of a server that provides the content (the video content server 13 in the present embodiment) is written.

In "Date", a time and date of creation of the HTTP-GET request is written.

In "User-Agent", information for transmitting information on a browser to the server is written. No special format is defined, and "IP Broadcast Receiver" is used in the present embodiment.

In "Connection", information relating to TCP layer connection after completion of a response to the HTTP request is written. In order to request to keep the TCP layer connection, "Keep-Alive" is written. On the contrary, in order to request to terminate the TCP layer connection, "Close" is written.

In "X-Request-Play-Mode", a view mode for viewing the content requested by the playback device is written.

In "X-TimeSeekRange", a beginning position on the content requested to be transmitted is designated. This beginning position is designated based on a duration counting from the beginning of the content. By designating, in "X-TimeSeekRange", the number of seconds on viewing the content from the beginning, the user can view the content starting from the position on the content where the viewing has been lastly paused. As a result, the video content server 13 transmits a part of the content starting from the position designated in the "X-TimeSeekRange". The details are defined in "Streaming Functional Specifications in Digital Television Network Functional Specifications, Protocol Part, Revision 1.2" published by the Digital Television Information Study Group in Dec. 21, 2010.

To the HTTP-GET request such as described above, the video content server 13 returns a response shown below, for example.

"HTTP/1.1 200 OK

Date: Wed Jul. 20 15:00:01 2011 GMT

Server: Video Streaming Server

Content-Type: video/mpeg

Content-Length: 5452000000 byte

X-Available-Play-Mode: 2D3D

X-TimeSeekRange: npt-time=00:60:00-bytes=5452000000-1093999999/1 094000000"

Here, the request processing unit 72 realizes the distribution instruction function described above, in the following procedure.

Upon receiving a request for content distribution, the request processing unit 72 extracts, from the received request for content distribution, a content name, a view mode, and the number of seconds on viewing on a content requested to be distributed. Then, the request processing unit 72 instructs the VOD distribution control unit 74 to distribute the requested content for distribution, by notifying the VOD distribution control unit 74 of the content name, the view mode, and the number of seconds on viewing the requested content.

The following describes the VOD distribution control unit 74.

The VOD distribution control unit 74 distributes a content in the streaming format that is instructed for distribution by the request processing unit 72.

The VOD distribution control unit 74 distributes, to the playback device that has made a request for content distribution, a part of the content having the notified content name starting from the notified position corresponding to the notified number of seconds on viewing the content. Also, in the case where the notified view mode is "2D", the VOD distribution control unit 74 distributes the content as a 2D video. In the case where the notified view mode is "stereoscopic_MVC", the VOD distribution control unit 74 distributes the content as a 3D video. Here, in the case where the content has been coded in the MVC method and the notified view mode is "2D", the VOD distribution control unit 74 distributes the content as a 2D video that contains only one base view without containing a dependent view. Also, in the case where the content has been coded in the MVC method and the notified view mode is "stereoscopic_MVC", the VOD distribution control unit 74 distributes the content as an MVC video (3D video) that contains both one base view and one dependent view.

<2-4. Playback Device 3>

The playback device 3 is a device that plays back a content while receiving the content in the streaming format.

Figure 9:
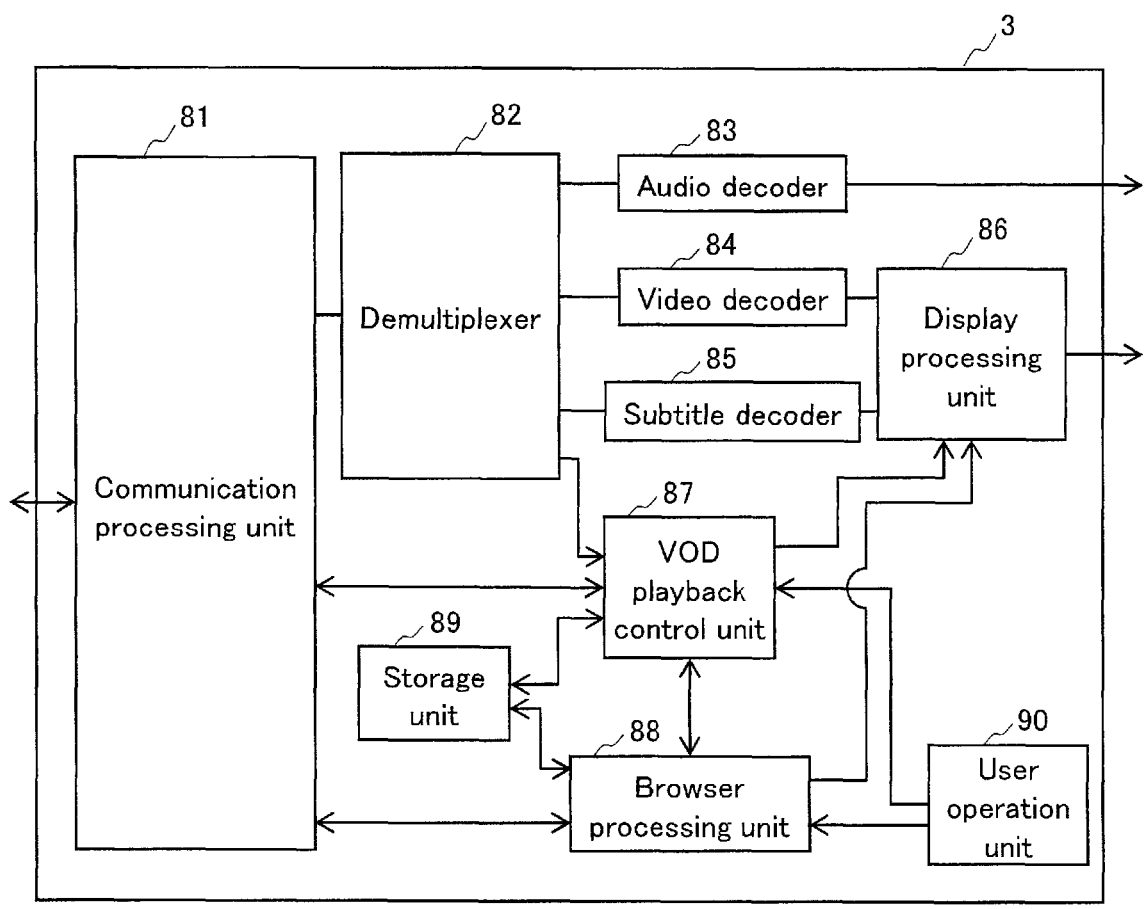
FIG. 9 is a block diagram showing the structure of a playback device.

FIG. 9 is a block diagram showing the structure of the playback device 3.

The playback device 3 includes, as shown in FIG. 9, a communication processing unit 81, a demultiplexer 82, an audio decoder 83, a video decoder 84, a subtitle decoder 85, a display processing unit 86, a VOD playback control unit 87, a browser processing unit 88, a storage unit 89, and a user operation unit 90. The playback device 3 also includes a processor and a memory. The respective functions of the VOD playback control unit 87 and the browser processing unit 88 are realized by the processor executing a program stored in the memory.

The communication processing unit 81 is composed of a communication LSI. The communication processing unit 81 transmits and receives data via the network 5.

The demultiplexer 82 is composed of a demultiplexer LSI. The demultiplexer 82 receives a multiplexed MPEG-2 TS, and demultiplexes the multiplexed MPEG-2 TS into packets such as video packets, audio packets, subtitle packets, and PSI/SI packets. The demultiplexer 82 outputs the audio packets, video packets, subtitle packets, and PSI/SI packets, which each result from demultiplexing the multiplexed MPEG-2, to the audio decoder 83, the video decoder 84, the subtitle decoder 85, and the VOD playback control unit 87, respectively.

The audio decoder 83 is embodied by an LSI for AV signal processing. The audio decoder 83 decodes the audio packets to obtain audio signals, and outputs the audio signals to an external device.

The video decoder 84 is embodied by the above LSI for AV signal processing. Upon receiving a notification of a view mode to be used for playback of the content from the VOD playback control unit 87, the video decoder 84 decodes the video packets to obtain video signals such that videos are displayable in the notified view mode, and outputs the video signals to the display processing unit 86. In the case where the video packets have been coded in the MVC method and the notified view mode is "2D", the video decoder 84 decodes only frames of the base view without decoding any dependent view, to generate video signals representing a 2D video. Then, the video decoder 84 outputs the generated video signals to the display processing unit 86. Also, in the case where the video packets have been coded in the MVC method and the notified view mode is "stereoscopic_MVC", the video decoder 84 decodes frames of the base view of the video packets, and then decodes frames of the dependent view, to generate video signals for realizing alternate display of left images and right images. Then, the video decoder 84 outputs the generated video signals to the display processing unit 86.

The subtitle decoder 85 is embodied by the above LSI for AV signal processing. The subtitle decoder 85 decodes subtitle packets to obtain subtitle signals, and outputs the subtitle signals to the display processing unit 86.

The display processing unit 86 is embodied by the above LSI for AV signal processing. The display processing unit 86 generates a display image which is to be displayed by superimposing the subtitle signals received from the subtitle decoder 85 on the video signal received from the video decoder 84. Then, the display processing unit 86 outputs the generated display image to an external device such as the display. Also, the display processing unit 86 generates a display image by using independently a page image formed based on an HTML document, a BML document, or the like, or by superimposing such a page image on a video and a substitute. Then, the display processing unit 86 outputs the generated display image to an external device such as the display.

The VOD playback control unit 87 performs playback control on a content. The playback control mainly includes playback start control, and playback pause control/playback stop control.

Firstly, playback start control is described.

The VOD playback control unit 87 starts playback of a playback target content that the user has instructed the browser processing unit 88 to play back. Specifically, in order to receive the playback target content from the video content server 13 for playback, the VOD playback control unit 87 instructs the audio decoder 83 to decode audio packets, notifies the video decoder 84 of a view mode to be used for playback of the content and instructs the video decoder 84 to decode video packets, and instructs the subtitle decoder 85 to decode subtitle packets.

Next, playback pause control/playback stop control is described.

Upon receiving a content playback pause instruction on the content from the user operation unit 90, the VOD playback control unit 87 instructs the audio decoder 83 to suspend decoding of the audio packets, instructs the video decoder 84 to suspend decoding of the video packets, and instructs the subtitle decoder 85 to suspend decoding of the subtitle packets. At this time, the VOD playback control unit 87 stores therein the number of seconds on viewing the content, and notifies the browser processing unit 88 of the stored number of seconds on viewing the content. Then, the VOD playback control unit 87 instructs the communication processing unit 81 to terminate TCP connection between the playback device 3 and the video content server 13.

The browser processing unit 88 interprets an HTML document or a BML document acquired from the server, executes a script written in the interpreted document, and presents the executed script. The browser processing unit 88 has a function of displaying content list (S202 in FIG. 12), a function of controlling storage of playback target content information (S204 in FIG. 12), a function of displaying playback position selection screen (S206 in FIG. 12), a function of making a request for playback control information transmission (S17 in FIG. 10), a function of determining view mode (FIG. 13), and a function of transmitting content playback stop notification (FIG. 14).

The function of displaying content list is a function of acquiring a content list document, which is in the form of an HTML document or a BML document, from the portal server 11, and performing display in accordance with the HTML standards or the BML standards. In this case, respective content names of content tags included in the content list document are presented to the user.

The function of controlling storage of playback target content information is a function of controlling storage and update of playback target content information. Specifically, the browser processing unit 88 extracts, from a content tag of a playback target content included in the content list document, a MetaFileURL, a ReturnURL, a PlayMode, and a content name. Then, the browser processing unit 88 controls the storage unit 89 to store therein these extracted pieces of information, as playback target content information. The elements such as the MetaFileURL contained in the playback target content information are the same as those of the corresponding content tag included in the content list document.

The function of displaying playback position selection screen is a function of instructing to display a playback position selection screen. The playback position selection screen is a screen for selecting playback of the playback target content from the beginning or resume playback of the playback target content (playback starting with a position where viewing has been lastly paused).

The function of making a request for playback control information transmission is a function of reading the MetaFileURL contained in the playback target content information to make a request for transmission of the playback control information transmission of the playback target content.

The function of determining view mode is a function of determining a view mode by displaying available view modes for viewing the playback target content on the display and prompting the user to select one among the available view modes.

The function of transmitting content playback stop notification is a function of, upon pause or stop of playback of the playback target content, transmitting the notification by putting the content of the notification to a request to a ReturnURL (a resource on the portal server 11 in the present embodiment).

Specifically, the browser processing unit 88 transmits the content playback stop notification, by transmitting an HTTP request message containing a URL as shown below.
ReturnURL?Status=StatusCode
[&StopPos=StopPosition]&PlayMode=2D3D
Here, in "ReturnURL", the ReturnURL contained in the playback target content information is written.

Also, "Status" represents an exit state of the playback device that has played back the playback target content. While a value of 0 represents the normal exit, a value of −2 or less represents any error. The details are defined in "Streaming Functional Specifications in Digital Television Network Functional Specifications, Browser Part, Revision 1.2" published by the Digital Television Information Study Group in Dec. 21, 2010.

A parameter "StopPos" represents a playback stop position on the content where playback has been paused. In "StopPosition", the number of seconds on viewing the content which is notified by the VOD playback control unit 87, is written as a value of the parameter "StopPos".

A parameter "PlayMode" represents a view mode in which the content has been played back. In "2D3D", a value of the parameter "PlayMode" is written. In the case where the content has been played back as a 2D video, "2D" is written. In the case where the content has been played back as a 3D video, "stereoscopic_MVC" is written.

The content playback stop notification contains a user ID and a device ID, together with the above HTTP request message.

The browser processing unit 88 transmits the content playback stop notification to the portal server 11.

The storage unit 89 is composed of a non-volatile memory. The storage unit 89 stores therein playback target content information.

The storage unit 89 also stores therein a user ID of the user of the playback device 3 (the user ID "U01" in the present embodiment) and a device ID assigned to the playback device 3 (the device ID "D01" in the present embodiment).

The user operation unit 90 is composed of a key pad, a remote control, and so on. The user operation unit 90 notifies each of the VOD playback control unit 87 and the browser processing unit 88 of an instruction input by the user operating the key pad, the remote control, or the like.

The playback device 4 has the same structure as the playback device 3, and accordingly description thereof is omitted here. Note that the storage unit 89 included in the playback device 4 stores therein the user ID "U01" and a device ID "D02".

3. Operations

<3-1. Whole Operations>

The following describes the whole operations of playback of a content by the playback device 3 in the content providing system 1 having the above structure.

Figure 10:
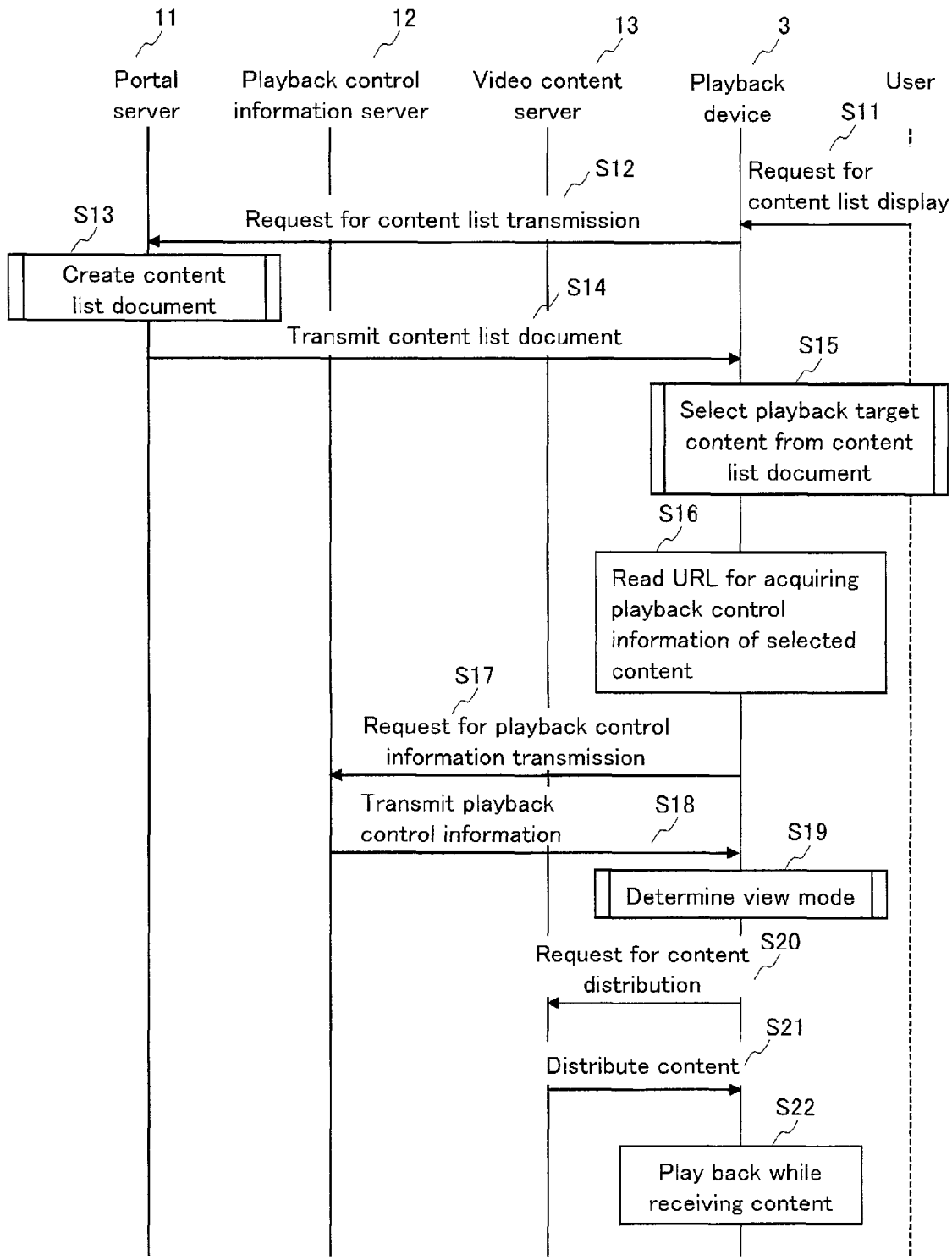
FIG. 10 is a flowchart of the whole operations of playing back a content.

FIG. 10 is a flowchart of the whole operations of playback of a content.

Firstly, the user of the playback device 3 inputs a request for content list display via the user operation unit 90 included in the playback device 3 (S11). Upon receiving the request for content list display, the user operation unit 90 notifies the browser processing unit 88 of the request for content list display.

The browser processing unit 88 transmits a request for content list transmission to the portal server 11 (S12). Note that the playback device 3 communicates with other device always via the communication processing unit 81. Hereinafter, for the purpose of simplifying the description on communication, the explanation of "via the communication processing unit 81" is sometimes omitted. The same applies to communication performed in other devices.

In the portal server 11, upon receiving the request for content list transmission, the communication processing unit 31 outputs the received request for content list transmission to the data processing unit 32. The data processing unit 32 performs content list document creation processing (S13). The details of this processing is shown later in FIG. 11.

The data processing unit 32 transmits a created content list document to the playback device 3 (S14).

Upon receiving the content list document, the playback device 3 performs processing of selecting playback target content from the content list (S15). The details of this processing is shown later in FIG. 12.

The browser processing unit 88 included in the playback device 3 reads a MetaFileURL contained in playback target content information, as a URL for acquiring playback control information corresponding to the selected content (S16). The browser processing unit 88 makes a request for playback control information transmission to the read URL (indicating a resource on the playback control information server 12 in the present embodiment) via the communication processing unit 81 (S17).

The playback control information server 12 transmits the playback control information to the playback device 3 (S18).

Upon receiving the playback control information, the playback device 3 performs view mode determination processing (S19).

Figure 13:
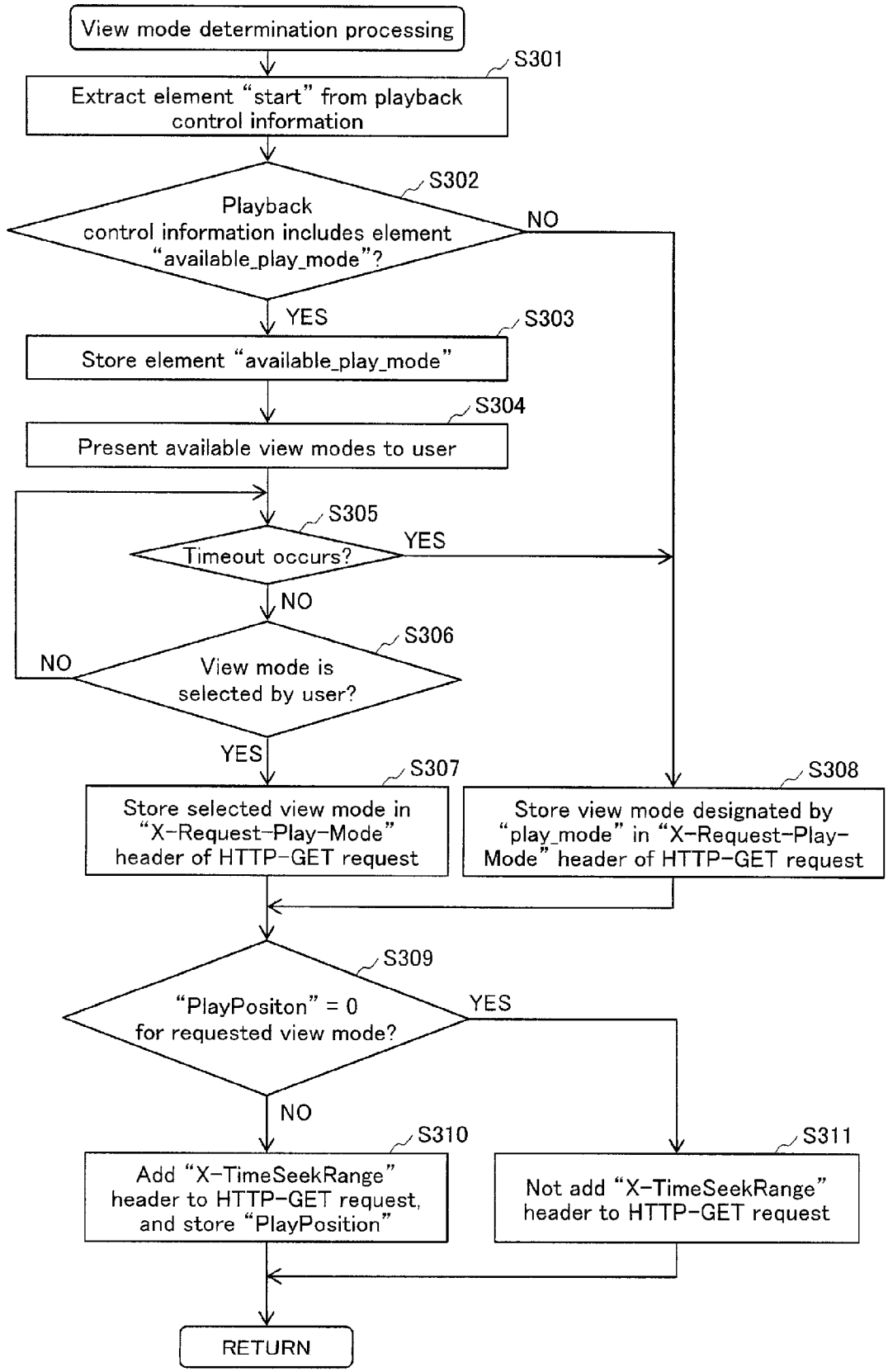
FIG. 13 is a flowchart of view mode determination processing.
Figure 14:
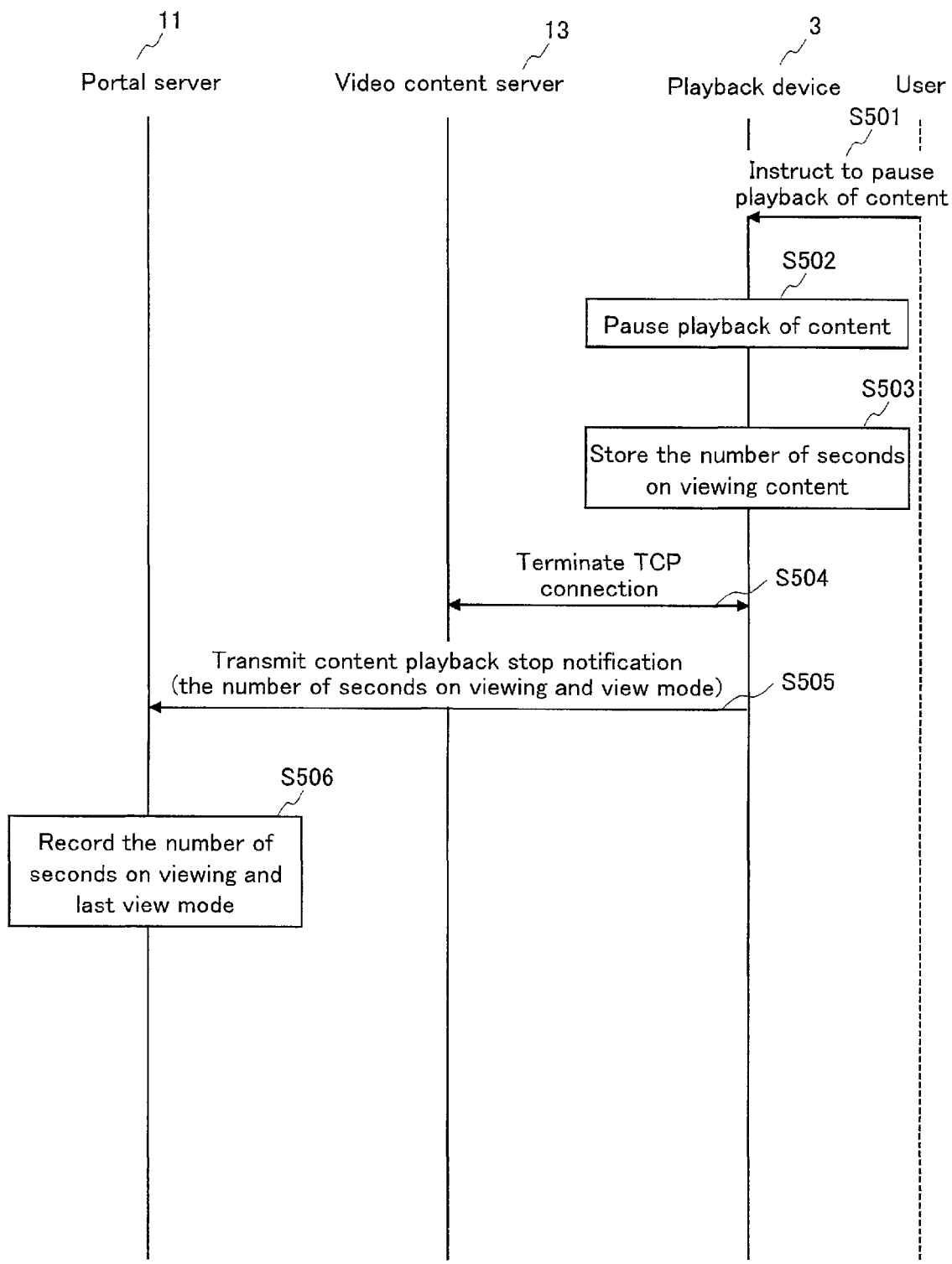
FIG. 14 is a flowchart of content viewing pause processing.

The details of this processing is shown in FIG. 13.

The browser processing unit 88 included in the playback device 3 issues an HTTP-GET request to the video content server 13 via the communication processing unit 81 to make a request for content transmission (S20).

The video content server 13 transmits the content requested by the HTTP-GET request to the playback device 3 that has issued the HTTP-GET request (S21).

Here, the video content server 13 transmits the content so as to be viewable in a view mode written in "Play_mode" contained in the HTTP-GET request. Also, in the case where the HTTP-GET request contains a header "X-Time-SeekRange", the video content server 13 transmits a part of the content starting from a position designated by the header "X-TimeSeekRange" to the playback device 3.

In order to receive the content from the video content server 13 for playback, the VOD playback control unit 87 included in the playback device 3 performs playback start control, by instructing the audio decoder 83, the video decoder 84, and the subtitle decoder 85 to decode audio packets, decode video packets, and decode subtitle packets, respectively. In the playback device 3, the audio decoder 83, the video decoder 84, and the subtitle decoder 85 decode the audio packets, video packets, and subtitle packets, respectively. Like this, the playback device plays back the content while receiving the content in the streaming format from the video content server 13 (S22).

<3-2. Content List Document Creation Processing>

The following describes the content list document creation processing shown in S13 in FIG. 10.

Figure 11:
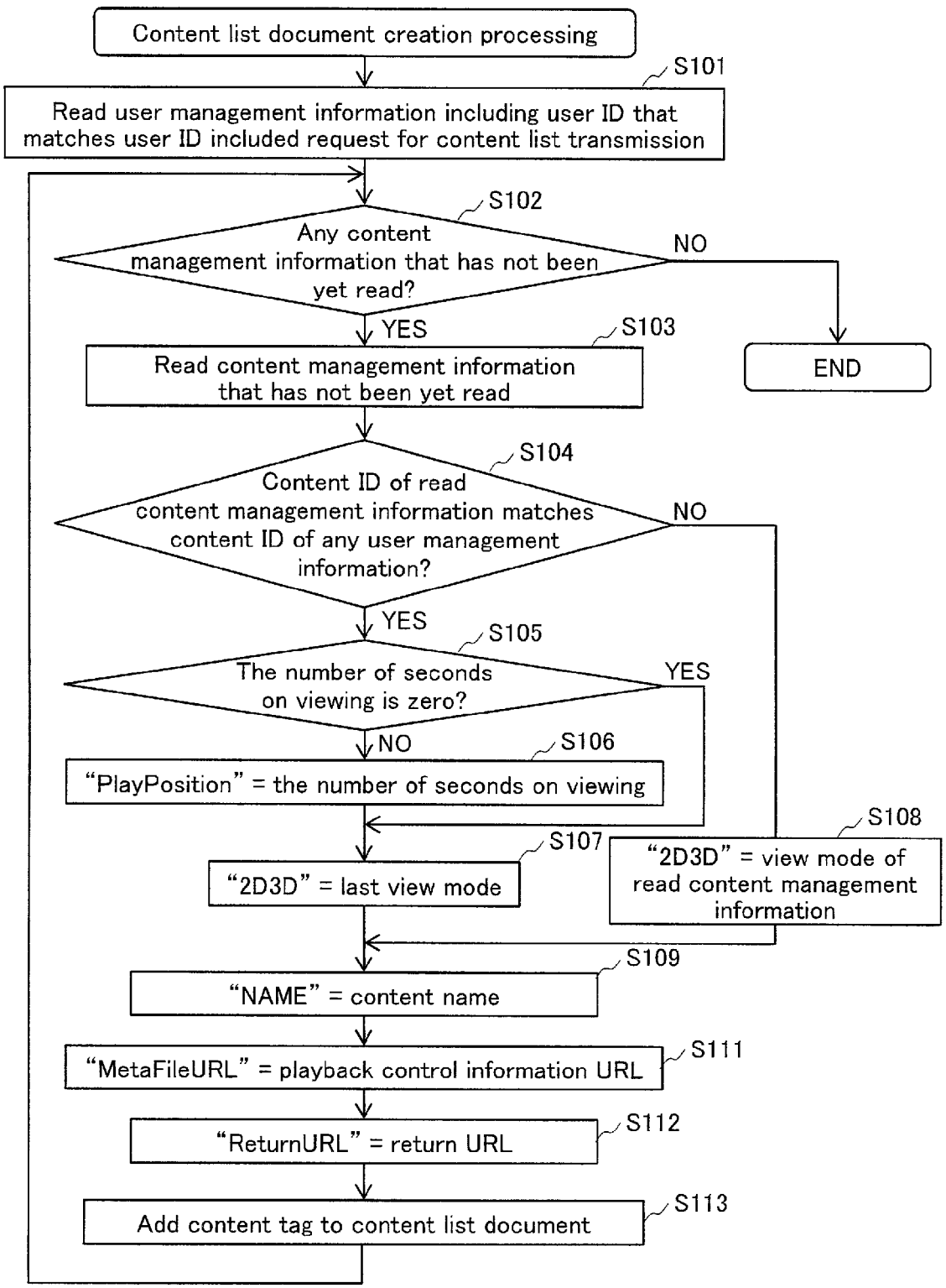
FIG. 11 is a flowchart of content list document creation processing.

FIG. 11 is a flowchart of the content list document creation processing.

In S12 in FIG. 10, the data processing unit 32 included in the portal server 11 receives the request for content list transmission from the playback device 3. The request for content list transmission contains the device ID of the playback device 3 that has transmitted the request for content list transmission and the user ID of the user of the playback device 3.

The data processing unit 32 reads, from the storage unit 33, a piece of user management information containing a user ID that matches the user ID contained in the request for content list transmission (S101).

Also, the data processing unit 32 judges whether there is any piece of content management information that has not been yet read (S102). If judging that all of the pieces of content management information have been already read (S102: NO), the data processing unit 32 ends the processing.

If judging that there is any piece of content management information that has not been yet read (S102: YES), the data processing unit 32 reads the piece of content management information (S103).

Then, the data processing unit 32 judges whether a content ID contained in the read piece of content management information matches a content ID contained in any piece of user management information (S104).

If judging that the content ID contained in the read piece of content management information matches a content ID contained in any piece of user management information (S104: YES), the data processing unit 32 further judges whether the number of seconds on viewing the content contained in the piece of user management information is zero (S105). If judging that the number of seconds on viewing is not zero (S105: NO), the data processing unit 32 adds "PlayPosition" to a content tag of the content, and sets the number of seconds on viewing the content as a value of the "PlayPosition" (S106). If judging that the number of seconds on viewing is zero (S105: YES), the data processing unit 32 does not add "PlayPosition" to the content tag.

Here, supplementary description is given on S104 to S106. In S104 to S106, any comparison between device IDs is not performed. Accordingly, even if a device ID contained in the piece of user management information does not match the device ID contained in the request for content list transmission, the number of seconds on viewing contained in the piece of user management information is set in the "PlayPosition" of the content tag, as long as (a) the content ID contained in the piece of user management information matches the content ID contained in the read piece of content management information and (b) the user ID contained in the piece of user management information matches the user ID contained in the request for content list transmission.

As a specific example, assume a case where viewing of a content A on the playback device 3 having the device ID "D01" has been paused, and then a request for content list transmission is made by the playback 4 having the device ID "D02" whose user is the same as the user of the playback device 3. In this case, in "PlayPosition" of a content tag of the content A in a content list document acquired by the playback device 4, the number of seconds on viewing the content A in the playback device 3 is set, which has a different device ID from the playback device 4 but is owned by the same user. This completes the supplementary description on S104 to S106, and returns to the description on the flowchart.

In S107, the data processing unit 32 sets, in "2D3D" of the content tag, the last view mode contained in the piece of user management information (S107). Then, the flow proceeds to S109.

If the judging that the content ID contained in the read piece of content management information does not match a content ID contained in any piece of user management information (S104: NO), the data processing unit 32 sets, in "2D3D" of the content tag, the view mode contained in the read piece of content management information (S108). Then, the flow proceeds to S109.

In S109, the data processing unit 32 sets, in "NAME" of the content tag, a content name contained in the read piece of content management information (S109).

Then, the data processing unit 32 sets, in "MetaFileURL" of the content tag, a playback control information URL contained in the read piece of content management information (S111). The data processing unit 32 sets, in "ReturnURL" of the content tag, a return URL contained in the read piece of content management information (S112).

The data processing unit 32 adds the content tag generated in this way to the content list document (S113). Then, the flow proceeds to S102.

<3-3. Processing of Selecting Playback Target Content from Content List>

The following describes the processing of selecting playback target content from content list shown in S15 in FIG. 10.

Figure 12:
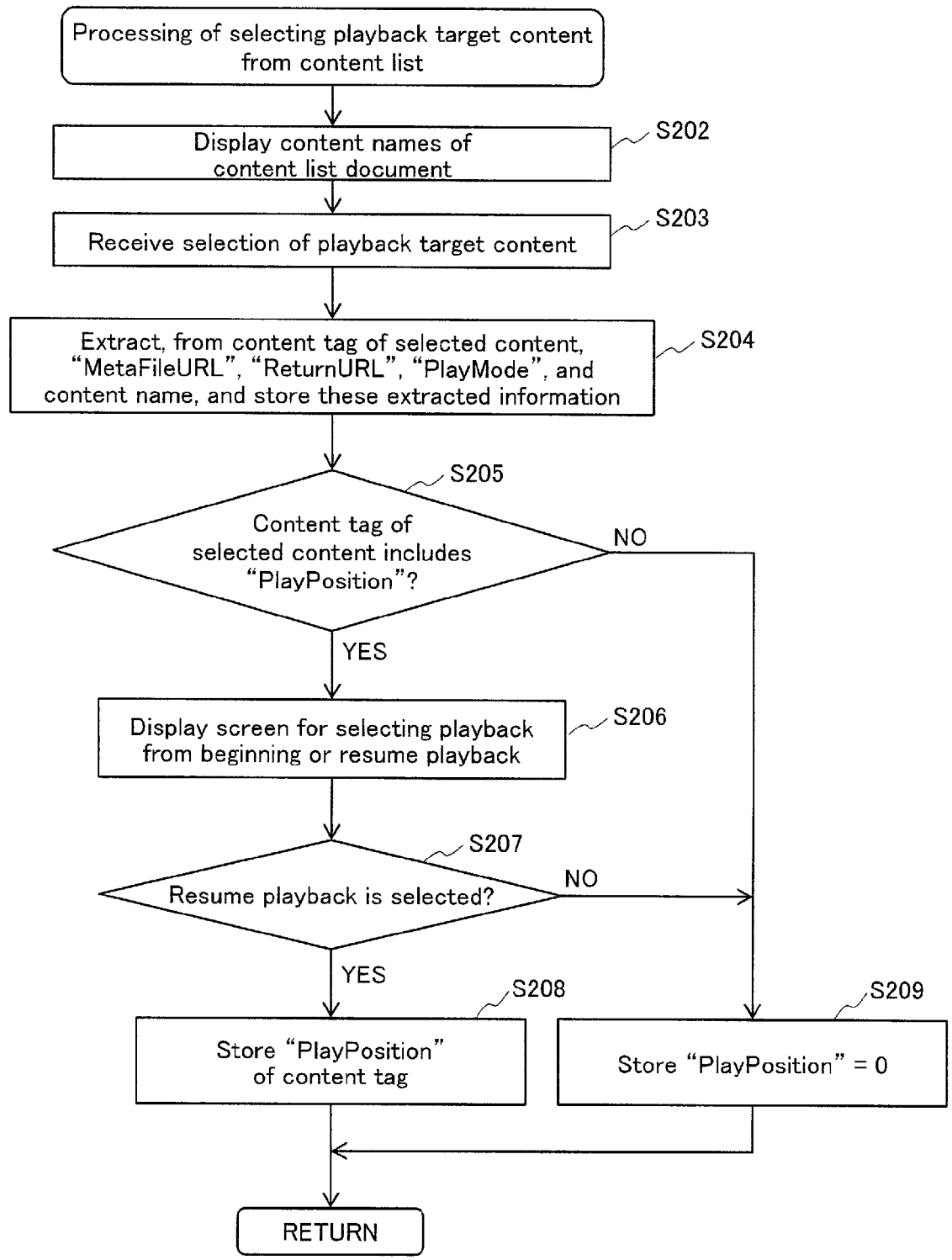
FIG. 12 is a flowchart of processing of selecting playback target content from content list.

FIG. 12 is a flowchart of the processing of selecting playback target content from content list.

The communication processing unit 81 included in the playback device 3 acquires a content list document from the portal server 11, and transfers the acquired content list document to the browser processing unit 88.

The browser processing unit 88 outputs the content list document, which has been received from the portal server 11, to the display processing unit 86. The content list document is in the form of an HTML document. The display processing unit 86 displays the received content list document on a display (not illustrated) (S202).

Here, in the case where any content tag contains "PlayPosition" in the content list document, a content corresponding to the content tag is displayed with an icon or the like such that the user can recognize that viewing of the content has been paused.

Next, the user operation unit 90 receives selection of a content that the user hopes to play back (playback target content), which is input by the user who has checked the content list document, and notifies the browser processing unit 88 of the selected playback target content (S203).

Here, the user selects the playback target content, for example by operating the remote control to move a cursor displayed on the display to select one among content names listed on the display, and pressing a determination button.

The browser processing unit 88 extracts, from the content tag of the playback target content included in the content list document, a MetaFileURL, a ReturnURL, a PlayMode, and a content name, and stores therein these extracted pieces of information as playback target content information (S204).

Then, the browser processing unit 88 judges whether the content tag of the playback target content contains "PlayPosition" (S205). If judging that the content tag contains "PlayPosition" (S205: YES), the browser processing unit 88 instructs the display processing unit 86 to display a playback position selection screen, which is a screen for selecting playback of the playback target content from the beginning of the playback target content or resume playback of the playback target content (S206). The display processing unit 206 displays the playback position selection screen on the display, and waits for the user's input.

If the user's input indicates selection of resume playback (S207: YES), the browser processing unit 88 stores therein the "PlayPosition" contained in the content tag as "PlayPosition" of the playback target content information (S208), and then ends processing (RETURN).

If the user's input indicates selection of playback from the beginning (S207: NO), the browser processing unit 88 stores therein a value of 0 as the "PlayPosition" of the playback target content information (S209), and ends the processing (RETURN).

<3-4. View Mode Determination Processing>

The following describes the view mode determination processing shown in S19 in FIG. 10.

FIG. 13 is a flowchart of the view mode determination processing by the playback device 3.

The communication processing unit 81 included in the playback device 3 receives playback control information from the playback control information server 12, and outputs the received playback control information to the browser processing unit 88.

The browser processing unit 88 extracts an element "start" from the received playback control information, and controls the storage unit 89 to store therein the element "start" (S301).

The browser processing unit 88 judges whether the playback control information contains an element "available_play_mode" (S302).

If judging that the playback control information contains the element "available_play_mode" (S302: YES), the browser processing unit 88 controls the storage unit 89 to store therein the element "available_play_mode" (S303).

Figure 15:
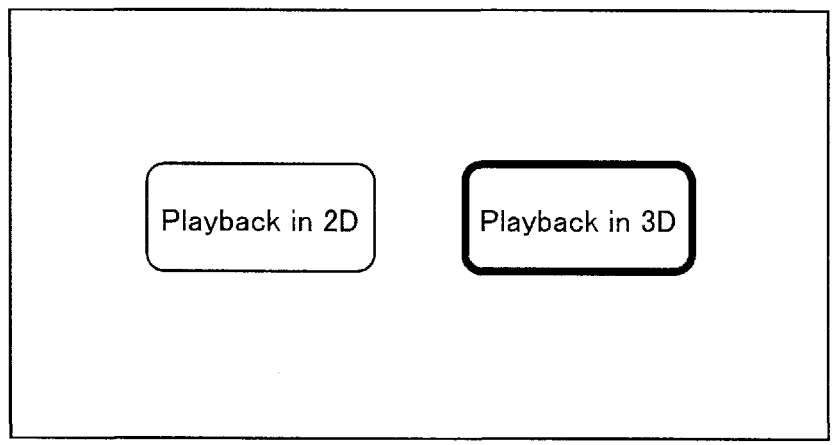
FIG. 15 shows an example of a view mode selection screen.

Then, the browser processing unit 88 instructs the display processing unit 86 to display a screen for prompting the user to select the user's desired view mode (hereinafter, "view mode selection screen") on which available view modes written in the "available_play_mode" are included. The display processing unit 86 displays, for example, a view mode selection screen on the display such as shown in FIG. 15 (S304). In the view mode selection screen shown in FIG. 15, the view mode "Playback in 3D" is highlighted by default so as to be distinguishable from the view mode "Playback in 2D". In FIG. 15, a view mode among the available view modes that is to be highlighted is determined in accordance with a view mode written in "PlayMode" of the content tag of the playback target content included in the content list document received by the playback device 3 from the portal server 11.

The browser processing unit 88 waits for the user to make an input for selecting a view mode until a predetermined time period has lapsed (until the timeout occurs) (S305). If no view mode is selected until the timeout occurs (S305: YES), the browser processing unit 88 stores "play_mode" contained in the content tag of the playback target content in the header "X-Request-Play-Mode" of the HTTP-GET request, as a view mode to be requested to the video content server 13 (S308). Then, the flow proceeds to S309.

If a view mode is selected by the user's input until the timeout occurs (S306: YES), the browser processing unit 88 stores the selected view mode in the header "X-Request-Play-Mode" of the HTTP-GET request, as a view mode to be requested to the video content server 13 (S307). Then, the flow proceeds to S309.

In S302, if the browser processing unit 88 judges that the playback control information does not contain the element "available_play_mode" (S302: NO), the flow proceeds to S308.

In S309, the browser processing unit 88 judges whether "PlayPositon" contained in the playback target content information is a value of 0 (S309).

If judging that the "PlayPositon" has a value of 0 (S309: YES), the browser processing unit 88 does not additionally contain a header "X-TimeSeekRange" in the HTTP-GET request (S311), and then ends the processing (RETURN).

If judging that the "PlayPositon" does not have a value of 0 (S309: NO), the browser processing unit 88 adds a header "X-TimeSeekRange" to the HTTP-GET request, and sets the "PlayPosition" as its value (S310), and then ends the processing (RETURN).

<3-5. Content Viewing Pause Processing>

The following describes processing for pausing viewing of a content, while the playback device 3 plays back the content in the streaming format in the procedure shown in FIG. 10. In this processing, the playback device 3 controls the portal server 11 to store therein the number of seconds on viewing the content as a viewing pause position on the content where viewing has been paused.

FIG. 14 is a flowchart of the content viewing pause processing.

While a content is being played back in the streaming format, the user of the playback device 3 instructs the playback device 3 to pause playback of the content via the user operation unit 90 (S501).

The user operation unit 90 outputs a content playback pause instruction to the VOD playback control unit 87. Upon receiving the content playback pause instruction, the VOD playback control unit 87 instructs the audio decoder 83 to suspend decoding of audio packets, instructs the video decoder 84 to suspend decoding of video packets, and instructs the subtitle decoder 85 to suspend decoding of subtitle packets (S502). At this time, the VOD playback control unit 87 stores therein the number of seconds on viewing the content (S503).

Upon being instructed to suspend decoding of the audio packets, the audio decoder 83 suspends decoding of the audio packets. Also, upon being instructed to suspend decoding of the video packets, the video decoder 84 suspends decoding of the video packets. Also, upon being instructed to suspend decoding of the subtitle packets, the subtitle decoder 85 suspends decoding of the subtitle packets.

Then, the VOD playback control unit 87 instructs the communication processing unit 81 to terminate TCP connection between the playback device 3 and the video content server 13. Upon being instructed to terminate the TCP connection, the communication processing unit 81 terminates the TCP connection between the playback device 3 and the video content server 13 (S504).

Next, the browser processing unit 88 transmits a content playback stop notification, which contains a user ID and a device ID, to the portal server 11 via the communication processing unit 81 (S505).

The browser processing unit 88 writes, in "StopPosition" of the content playback stop notification, the number of seconds on viewing stored in S503. Also, the browser processing unit 88 writes, in "2D3D" of the content playback stop notification, a view mode used for playback of the content.

In the portal server 11, the communication processing unit 31 receives the content playback stop notification (S506), and outputs the received content playback stop notification to the data processing unit 32.

The data processing unit 32 extracts the "StopPosition" and the "PlayMode" from an HTTP request message contained in the received content playback stop notification. The data processing unit 32 writes the extracted "PlayMode" and "StopPosition" in a last view mode and the number of seconds on viewing, respectively, which are contained in a piece of user management information whose user ID and device ID match the user ID and the device ID that are contained in the content playback stop notification, respectively.

Here, although essentially unrelated to the present invention, the communication in S505 is performed by issuing an HTTP-GET request to a resource indicated by a "ReturnURL". Also, as the resource indicated by the "ReturnURL", a content list document is generally used. In other words, after performing the processing of S506, the portal server 11 transmits the content list document to the playback device 3.

<3-6. Content Viewing Resume Processing>

Content viewing resume processing is processing of resuming viewing of a content which has been paused such as described with reference to FIG. 14. The content viewing resume processing is performed in accordance with the flow-charts shown in FIG. 10 to FIG. 13 as described above.

The following describes the content viewing resume processing, taking a specific example, with reference to flow-charts shown in FIG. 10 to FIG. 13.

This content viewing resume processing is based on the following assumptions. Viewing of the content A is paused. The content A has the content ID "C01", and is viewable in both the "2D" view mode and the "stereoscopic_MVC" view mode. Playback control information corresponding to the content A transmitted by the playback control information server 12 contains an element "available_play_mode" in which both values "2D" and "stereoscopic_MVC" are written.

Until pause of viewing of the content A, the content A has been played back by the playback device 3 having the device ID "D01" in the "stereoscopic_MVC" view mode. At the time of the pause of viewing the content A, the number of seconds on viewing the content A is 3600.

Viewing of the content A is resumed by not the playback device 3 by but the playback device 4. Until resumption of viewing of the content A, the content A has not been viewed by the playback device 4. The playback device 3 and the playback device 4 are owned by the same user who has the user ID "U01".

In FIG. 4, the user management information relating to this user is shown, which is stored in the storage unit 33 included in the portal server 11 immediately before resumption of viewing of the content A.

On the assumptions described above, the following description is given with reference to FIG. 10 to FIG. 13. Note that FIG. 10 to FIG. 13 referred to here have been already described in detail. Accordingly, the detailed description on all the Steps is not given here, and the description is appropriately simplified depending on the importance of each Step.

Firstly, in S11 in FIG. 10, the user of the playback device 4 inputs a request for content list display via the user operation unit 90 included in the playback device 4 (S11). The user operation unit 90 receives the request for content list display, and notifies the browser processing unit 88 of the request for content list display.

The browser processing unit 88 transmits a request for content list transmission to the portal server 11 (S12). In the portal server 11, the communication processing unit 31 receives the request for content list transmission, and outputs the received request for content list transmission to the data processing unit 32. The data processing unit 32 performs content list document creation processing (S13).

In the content list document acquired by the playback device 4, the "PlayPosition" of a content tag of the content A, which the user has paused viewing, has set therein a value of the number of seconds on viewing the content (3600) when it had been viewed in the playback device 3.

The browser processing unit 88 included in the playback device 4 controls the display processing unit 86 to display content names included in the content list document on the display (S15 in FIG. 10 and S202 in FIG. 12). Here, the content name of the content A is displayed with an icon such that the user can recognize that viewing of the content A has been paused.

The user selects the content A as a playback target content (S203). The browser processing unit 88 stores therein playback target content information relating to the content A (S204).

Here, since the content tag of the content A, which is selected as the playback target content, contains "PlayPosition" (S205: YES), the browser processing unit 88 controls the display processing unit 86 to display a playback position selection screen, which is a selection screen for selecting playback of the content A from the beginning or resume playback of the content A (S206).

Then, the user makes an input for selecting resume playback.

Since the user selects resume playback (S207: YES), the browser processing unit 88 stores therein a value of 3600 written in the "PlayPosition" contained in the content tag, as "PlayPosition" of the playback target content information (S208).

Then, the browser processing unit 88 reads "MetaFileURL" contained in the playback target content information (S16), and makes a request for playback control information transmission to the read URL (S17).

The playback control information server 12 transmits the playback control information corresponding to the content A to the playback device 3 (S18).

Upon receiving the playback control information from the playback control information server 12, the communication processing unit 88 extracts an element "start" from the playback control information (S301), and then extracts an element "available_play_mode" from the playback control information (S302 and S303).

Then, the browser processing unit 88 controls the display processing unit 86 to display, on the display, a view mode selection screen such as shown in FIG. 15, which is a screen for prompting the user to select one among available view modes ("2D" and "3D (stereoscopic_MVC)") written in the element "available_play_mode" contained in the playback control information (S304).

In the view mode selection screen shown in FIG. 15, a highlight is placed by default on a view mode ("3D Playback", for example), which is written in the "PlayMode" of the content tag of the content A included in the content list document received by the playback device 4 from the portal server 11.

Here, the user selects the "2D" view mode (S305 and S306).

The browser processing unit 88 stores "2D" in the header "X-Request-Play-Mode" of the HTTP-GET request (S307), and adds a header "X-TimeSeekRange" to the HTTP-GET request, and then sets a value of 3600 in the "PlayPosition" (S309 and S310).

Then, the browser processing unit 88 makes a request for content distribution to the video content server 13 by issuing an HTTP-GET request (S20 in FIG. 10).

The video content server 13 distributes, to the playback device 4, a part of the content A starting from the position after 3600 seconds from the beginning, such that the user can view the part in 2D.

The playback device 4 receives the content A from the video content server 13, and plays back the part of the content A starting from the position after 3600 seconds from the beginning.

This enables the user to switch from the view mode (3D (stereoscopic_MVC)) used for viewing the content A in the playback device 3 to other view mode (2D), and view the part of the content A in the other view mode (2D) in the playback device 4 starting from the playback pause position.

Although the above description has been given taking the example where the playback device 4 resumes viewing of the content A, the same applies to the case where the playback device 3 resumes viewing of the content A.

4. Modification Examples

Although the embodiment of the content providing system relating to the present invention has been described above, the exemplified content providing system may be modified in the following manners. The present invention is of course not limited to the content providing system described in the above embodiment.

(1) In the above embodiment, an HTML document is used by the portal server 11 for notifying the playback device 3 of the last view mode. Alternatively, it is only necessary to notify of the last view mode.

For example, as a function for starting playback, a new function for notifying of the last view mode may be defined, such as a function "launchIPTVContentEx( )".

This new function may be embedded in a BML document generated as a content list document so as to be allocated to the button to be pressed by the user, such as the purchase button for purchasing a content, the playback button and the like which are used for starting playback of the content. The playback device may use the notified last view mode as a default view mode for resuming playback of the content. Alternatively, the playback device may use the notified last view mode for determining on which button a focus is to be placed by default among buttons for selecting respective view modes to be displayed on the view mode selection screen.

launchIPTVContentEx(input String content_uri,input String ret_uri,input Number start_npt, [input String license_id,] input String play_mode)

Here, a parameter "content_uri" represents a URI of a playback control metafile corresponding to a playback target content. A parameter "ret_uri" represents a URI of a BML document to be displayed after playback of the content. A parameter "start_npt" represents a playback start time position on the content (the number of seconds on the content counting from the beginning). The playback device designates a time position passed by the argument "start_npt" to request the video content server 13 to transmit the content. A parameter "license_id" represents a license ID of a license for use in playing back the content. A parameter "play_mode" represents a view mode for viewing the content. In "play_mode", a value "2D" or a value "stereoscopic_MVC" is written. The parameter "play_mode" having the value "2D" indicates playback of the content as a 2D video. The parameter "play_mode" having the value of "stereoscopic_MVC" indicates playback of the content as a 3D video.

Alternatively, the view mode selection screen shown in FIG. 15 may be in the form of a BML document in which when either one of a button for selecting playback as a 2D video and a button for selecting playback as a 3D video is pressed, a function "launchIPTVContentEx( )" is executed.

Specifically, the BML document contains description that in the case where the button for selecting playback as a 2D video is selected, the function "launchIPTVContentEx( )" having a value "2D" as an argument "play_mode" is to be executed. Also, the BML document contains description that in the case where the button for selecting playback as a 3D video is selected, the function "launchIPTVContentEx( )" having a value "stereoscopic_MVC" as an argument "play_mode" is to be executed.

Also in this case, the BML document may be structured such that a focus is placed on a button for selecting a view mode that matches the last view mode contained in a piece of user management information stored in the portal server 11. In other words, in the case where the last view mode is "stereoscopic_MVC", the BML document is structured such that a focus is placed on a button for executing the function "launchIPTVContentEx( )" having the value "3D" as the argument "play_mode". On the contrary, in the case where the last view mode is "2D", the BML document is structured such that a focus is placed on a button for executing the function "launchIPTVContentEx( )" having the value "2D" as the argument "play_mode".

(2) In the modification example (1), the function "launchIPTVContentEx( )" is defined and used for notifying of the last view mode. However, it is only necessary to notify of the last view mode. For example, a view mode to be used may be designated with use of playback control information. In this case, an element "default_play_mode" shown in FIG. 7 is added to the playback control information, for example.

In the element "default_play_mode", a value "2D" or a value "stereoscopic_MVC" is written as its parameter value.

Further alternatively, the playback device may store therein beforehand the default selection of either one of playback as a 2D video and playback as a 3D video.

Yet alternatively, the element "default_play_mode" may represent the default view mode for viewing the content that has been set by a service provider or the like, instead of notifying of the last view mode.

Further alternatively, the element "default_play_mode" may be set by the content distribution system 2 in accordance with the display capability of each playback device. In other words, in the case where a playback device has a 3D display capability, the content distribution system 2 sets a value "3D" in the element "default_play_mode". On the contrary, in the case where a playback device does not have a 3D display capability, the content distribution system 2 sets a value "2D" in the element "default_play_mode".

(3) In the above embodiment, one or more available view modes written in "available_play_mode" are displayed on the display, as a view mode selection screen, and the user is prompted to make an input to select one among the view modes. However, it is only necessary to select a view mode. For example, the user may be prompted to select a view mode via a predetermined operation such as a press of a specific button.

(4) In the above embodiment, in order for the playback device 3 to notify the video content server 13 of a view mode, a header "X-Request-Play-Mode" is added to an HTTP-GET request. However, it is only necessary for the video content server 13 to recognize the view mode.

For example, the playback device 3 and the video content server 13 may determine beforehand an HTTP-GET request that does not contain a header "X-Request-Play-Mode" indicates designation of "2D". This ensures the compatibility with legacy devices that can play back a content only in 2D and do not support extension of adding the header "X-Request-Play-Mode" to the HTTP-GET request.

(5) In the above embodiment, in the case where a content to be transmitted is an MVC video and the value "2D" is written in the header "X-Request-Play-Mode", the video content server 13 performs processing of removing TS packets containing one or more dependent views for distribution. However, it is only necessary to transmit the content that does not contain any dependent view. For example, the video content server 13 may prepare beforehand a content that does not contain any dependent view for transmission. This avoids transmission of dependent views which are not to be used in the playback device, thereby to save the communication band.

(6) In the above embodiment, a device ID is assigned uniquely to each device by the content distributer upon request from the user, at a time of conclusion of the contract of content distribution. However, it is only necessary to uniquely identify each device with use of an IP address, a MAC address, or the like.

(7) In the above embodiment, in the case where the user has paused viewing of a content on the playback device 3 and then resumes the viewing of the content on the playback device 4, which has a different device ID from the playback device 3, the user selects one among available view modes for resuming viewing of the content. Alternatively, control for restricting selection of a view mode may be performed at resumption of the viewing of the content.

For example, assume a case where the playback device 3 which is a stationary terminal has a capability of displaying a content in 3D, and the playback device 4 which is a tablet terminal does not have a capability of displaying the content in 3D and has only a capability of displaying the content in 2D. In such a case, when the user resumes viewing of a content that has been paused on the playback device 4, control may be performed such that the 3D view mode is not displayed on the view mode selection screen as an option, or such that the user cannot select the 3D view mode.

(8) In the above embodiment, in the element "available_play_mode" contained in the playback control information, "2D" and/or "3D (stereoscopic_MVC)" are written as available view modes for viewing a content, and the playback devices 3 and 4 are each notified of the available view modes. However, it is only necessary to indicate visual representation modes for viewing the content, without limiting the view modes to "2D" and "3D (stereoscopic_MVC)".

For example, the view modes each may indicate an angle of the content represented by multi-angle. Alternatively, the view modes each may indicate each of a plurality of programs to be distributed at the same time.

In this case, in the element "available_play_mode" contained in the playback control information, values "View1" and "View2" that each represent an available view mode for viewing a content are written as shown in FIG. 16, for example. The view modes "View1", "View2", . . . each represent an angle, a program, or the like.

Further alternatively, the view mode each may indicate a resolution. In this case, in the element "available_play_mode" contained in the playback control information, values "SD (Standard Definition)", "HD (High Definition)", "4K", and "QVGA (Quarter Video Graphics Array)" are written, as available view modes each for viewing a content, as shown in FIG. 17, for example. Here, "4K" represents a resolution of approximately 4000×2000 dots.

Also, in the above embodiment, the examples have been described that the element "available_play_mode" and/or the element "default_play_mode" are additionally contained in the ERI. However, it is only necessary to notify of information equivalent to such an element. For example, an element having other name may be additionally contained in the ERI. Also in the above embodiment, as in the respective values of the elements, "2D" and/or "stereoscopic_MVC" are written. Alternatively, other value representing equivalent information (such as "3D") may be additionally contained in the ERI.

The above descriptions have been provided on the element "available_play_mode" contained in the playback control information. The same descriptions are also applied to the header "X-Request-Play-Mode" for use in communication between the playback device 3 and the video content server 13.

(9) In the above embodiment, an HTTP request is issued in the case where the playback device 3 or 4 requests the video content server 13 to "play back a content" or "resume playback (start distribution) of the content" and "pause playback of the content" or "stop playback of the content". However, it is only necessary to request the video content server 13 to "play back a content" or "resume playback (start distribution) of the content" and "pause playback of the content" or "stop playback of the content".

For example, RTP (Realtime Transport Protocol) may be employed for data communication, and RTSP (Real Time Streaming Protocol) may be employed for control protocol of the RTP. The RTP and the RTSP are defined in the RFC3550 and the RFC2326, respectively.

According to the RTSP, the following methods are used for playback of a content in the streaming format, including methods (a) SETUP, (b) PLAY, (c) PAUSE, and (d) TEARDOWN.

The method (a) "SETUP" is a method for instructing to reserve a resource for use in transmission of a stream to the server and to start a session.

The method (b) "PLAY" is a method for instructing to start transmission of media data by the resource reserved by the method (a) "SETUP". The method (b) "PLAY" is used for playback of a content.

The method (c) "PAUSE" is a method for instructing to temporarily suspend transmission of the stream without freeing a server resource. The method (c) "PAUSE" is used for both playback pause of a content and playback suspension (playback stop) of the content.

The method (d) "TEARDOWN" is a method for instructing to free the server resource and terminate the session.

Here, the method (b) "PLAY" is used, instead of issuance of an HTTP-GET request in the above embodiment.

The method (c) "PAUSE" is used, instead of transmission of a content playback stop notification in the above embodiment.

The method (a) "SETUP" is not especially equivalent to any method or the like in the above embodiment. The method (a) "SETUP" is used prior to the method (b) "PLAY".

The method (d) "TEARDOWN" is not especially equivalent to any method or the like in the above embodiment. The method (d) "TEARDOWN" is used for stopping playback of the content.

The following shows respective examples of request and response of the methods (a) SETUP, (b) PLAY, and (c) PAUSE. The method (d) "TEARDOWN" is not especially different from the definition in the RFC2326, and accordingly its description is omitted here.

Here, as a response to each of the methods (a) "SETUP", (b) "PLAY", and (c) "PAUSE", extension is performed by adding an extension header "X-Available-Play-Mode" in order to write a view mode available for viewing a content. In the header "X-Available-Play-Mode", one of the following viewing modes is written among "2D3D" indicating that the 2D view mode and the 3D view mode are both available, "2D" indicating that the 2D view mode is available, and "3D" indicating that the 3D view mode is available.

(a) SETUP
(Request)
SETUP rtsp://videoserver.com/AVData/0001.m2ts RTSP/1.0
CSeq: 2
Transport: RTP/AVP;unicast;clientport=5000-5001
X-Request-Play-Mode: 3D Here, the header "X-Request-Play-Mode" is an extension header to be added. In this header, a view mode for viewing a content to be requested to be distributed is written. In the header "X-Request-Play-Mode", "2D" may be designated, instead of "3D" described in the above example. Also, in terms of securing the compatibility, omission of the header "X-Request-Play-Mode" may be determined beforehand to indicate designation of "2D".

(Response)
RTSP/1.0 200 OK
CSeq: 2
Date: Wed Jul. 20 15:00:00 2011 GMT
Session: 505
Transport: RTP/AVP;unicast;clientport=5000-5001; sever_port=6000-6001
X-Available-Play-Mode: 2D3D (b) PLAY
(Request)
PLAY rtsp://videoserver.com/AVData/0001.m2ts RTSP/1.0
CSeq: 3
Session: 505
Range: npt=00:60:00-

Here, "Range" is equivalent to "XTimeSeekRange" described in the above embodiment.

(Response)
RTSP/1.0 200 OK
CSeq: 3
Date: Wed Jul. 20 15:02:00 2011 GMT
Range: ntp=00:60:00-
X-Available-Play-Mode: 2D3D (c) PAUSE
(Request)
PAUSE rtsp://videoserver.com/AVData/0001.m2ts RTSP/1.0
CSeq: 4
Session: 505
(Response)
RTSP/1.0 200 OK
CSeq: 4
Date: Wed Jul. 20 15:20:00 2011 GMT
X-Available-Play-Mode: 2D3D

(10) In the above embodiment, the playback device 3 receives playback control information corresponding to a content, analyzes the received playback control information, and then generates and displays a view mode selection screen such as shown in FIG. 15. However, it is only necessary to display a view mode selection screen.

For example, in the case where the content is an MVC video, the portal server 11 may inquire of the playback device 3 as to whether to play back the content as a 2D video or a 3D video. In this case, when the playback device 3 selects whether to play back the content as a 2D video or a 3D video, the portal server 11 transmits, to the playback device 3, a BML document or an HTML document for displaying a view mode selection screen such as shown in FIG. 15.

Also, on a view mode selection screen to be displayed, a focus may be placed by default on a button for selecting a view mode that has been selected in the last playback of a content that is notified by the playback device 3 that has performed the last playback of the content.

For example, in the case where a content has been lastly played back on the playback device 3 as a 3D video, a view mode selection screen for selecting a view mode for viewing this content is displayed such that a focus is placed on a button for selecting as a 3D video.

(11) In the above embodiment, when receiving a request for transmission of a content that is an MVC video as a 2D video from the playback device 3, the video content server 13 transmits a content that does not contain any dependent view. On the contrary, when receiving a request for transmission of a content that is an MVC video as a 3D video from the playback device 3, the video content server 13 transmits the content as an MVC video that contains both one base view and one or more dependent views. However, it is only necessary for the playback device 3 to play back the content in a requested view mode, namely, play back the content as a 2D video or as a 3D video.

For example, when receiving a request for transmission of a content that is an MVC video from the playback device 3, the video content server 13 may always transmit the content as an MVC video contains both one base view and one or more dependent views to the playback device 3, and the playback device 3 may control as to whether to play back the MVC video as a 2D video or a 3D video. In this case, even in the case where a view mode needs to be switched in the playback device 3, it is unnecessary to terminate communication between the playback device 3 and the video content server 13.

(12) In the above embodiment, in the element "available_play_mode", all the available view modes for viewing a content are written. Alternatively, only one or more view modes permitted for viewing the content may be written. This enables to purposely impose a restriction on available view modes such as a case where a creator of a content hopes that the content is to be viewed only as a 3D video.

For example, even in the case where a content is an MVC video, only "stereoscopic_MVC" is written in an element "available_play_mode" of playback control information corresponding to the content, without writing "2D". This enables the playback device to recognize that this content is permitted to be played back as a 3D video but is prohibited to be played back as a 2D video.

(13) In the above embodiment, the present invention has been described with use of the example of application to the content VOD service via the Internet distribution. However, a distribution timing of a content is not limited to real time such as a timing in the VOD, and it is only necessary to acquire the content prior to playback of the content.

For example, the present invention is also applicable to the download service according to which a user has downloaded a content beforehand, and plays back the downloaded content later.

In this case, the playback device 3 does not request the video content server 13 to transmit a content, and plays back a content that has been stored in the playback device 3. Also, when a playback target content is selected, the playback device 3 may refer to an element "available_play_mode" contained in playback control information corresponding to the selected content to display a view mode selection screen. This prompts a user to select one of available view modes for viewing the content.

(14) A control program may be recorded in a recording medium or distributed and made available via any type of communications channel. The control program is composed of program codes in a machine language or a high-level language, and is for causing the processor of each of the playback devices 3 and 4 and all circuits connected to the processor to perform the processing described in the above embodiment such as the processing of displaying content list, the processing of controlling storage of playback target content information, the processing of selecting playback location selection screen, the processing of making a request for playback control information transmission, the processing of determining view mode. The recording medium may be an IC card, a hard disk, an optical disc, a flexible disc, a ROM, a flash memory, or the like. The control program distributed and made available is used by storage in a processor read-accessible memory or the like so that the execution of the control program by that processor also realizes each of the functions described in the above embodiment. Instead of directly executing the control program, the processor may compile the control program and executes the compiled control program, or an interpreter may execute the control program.

(15) Each of the functional components described in the above embodiment may be embodied by a circuit executing its functions, or may be executing one or more processors. The functional components include the communication processing unit 31, the data processing unit 32, the storage unit 33, the communication processing unit 51, the data processing unit 52, the storage unit 53, the communication processing unit 71, the request processing unit 72, the storage unit 73, the VOD distribution control unit 74, the communication processing unit 81, the demultiplexer 82, the audio decoder 83, the video decoder 84, the subtitle decoder 85, the display processing unit 86, the VOD control unit 87, the browser processing unit 88, the user operation unit 90, and so on.

Each of the above functional components is typically embodied by an LSI that is an integrated circuit. Each of the functional components may be partially or entirely embodied by an LSI having one chip or multiple chips. Also, the LSI may be called an IC, a system LSI, a super LSI, or an ultra LSI, depending on the integration degree. A method of circuit integration is not limited to an LSI, and may be realized by a dedicated circuit or a general processor. Furthermore, it may be possible to use an FPGA (Field Programmable Gate Array) programmable after manufacturing LSIs or a reconfigurable processor in which connection and setting of a circuit cell inside an LSI is reconfigurable after manufacturing LSIs. Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

(16) The above embodiment and modification examples may be partially combined with each other.

5. Supplementary Descriptions

The following further describes the structures and effects of a content playback device as an embodiment of the present invention and its modification examples.

(1) An exemplary embodiment of the present invention provides a content playback device that plays back a video content while receiving the video content in a streaming format from a content distribution system that is connected therewith via a network, the content playback device comprising: a reception unit operable to receive, from the content distribution system, control information indicating a plurality of view modes selectable for viewing the video content; a presentation unit operable to present, to a user of the content playback device, the view modes as options of a view mode for viewing the video content; an input reception unit operable to receive an input selecting one view mode among the view modes from the user; and a request unit operable to request the content distribution system to distribute the video content in the streaming format, by transmitting information indicating the selected view mode to the content distribution system.

With this structure, it is possible to present beforehand, to the user, the switchability between the view modes to provide the user with an opportunity to switch between the view modes, thereby to improve the user's convenience.

(2) Also, the input reception unit may further operable, during the playback of the video content, to receive a pause instruction to pause the playback of the video content, and when the input reception unit receives the pause instruction, the presentation unit may present the view modes, as options of a view mode for viewing the video content to be used at resumption of the playback of the video content.

With this structure, it is possible to present beforehand, to the user, the switchability between the view modes at pause of the paused playback of the content, to provide the user with an opportunity to switch between the view modes, thereby to improve the user's convenience.

(3) Also, when the input reception unit receives the pause instruction, the presentation unit may display the view modes such that a view mode that has been used immediately before the reception of the pause instruction is distinguishable from any other of the view modes.

With this structure, it is possible for the user to easily distinguish, from any other of the view modes, the view mode that has been used immediately before pause of the playback of the content and accordingly the user is likely to select. This facilitates the user to select this used view mode among the view modes, thereby to improve the user's convenience.

(4) Also, in the case where, before the playback of the video content on the content playback device, the video content has been viewed by the user in a device other than the content playback device up to a certain point, the content distribution system may store therein a view mode used for viewing the video content on the other device, the reception unit may further receive, from the content distribution system, information indicating the view mode that has been used for viewing the video content in the other device, and the presentation unit may present the view modes such that the view mode that has been used in the other device is distinguishable from any other of the view modes.

With this structure, in the case where the video content has been viewed by the user on other device up to the certain point and then the video content is to be viewed on the content playback device starting from the certain point, it is possible for the user to easily distinguish, from any other of the view modes, the view mode that has been used immediately before pause of the playback of the content and accordingly the user is likely to select. This facilitates the user to select this used view mode among the view modes, thereby to improve the user's convenience.

(5) Also, the view modes presented by the presentation unit may not include any view mode that is not supported by the content playback device.

With this structure, the user can easily recognize view modes that are actually available.

(6) Also, the control information may have written therein the view modes each selectable as a view mode for viewing the video content, and the presentation unit may read the view modes written in the control information, and display the read view modes.

Also, the control information may be additionally contained in ERI, and the reception unit may receive the control information, by receiving the ERI from the content distribution system and extracting the control information from the ERI.

With this structure, it is possible to present beforehand, to the user, all the switchable view modes, thereby to improve the user's convenience.

(7) Also, the view modes may each support a different resolution.

With this structure, it is possible to present beforehand, to the user, all the switchable resolutions, thereby to improve the user's convenience.

(8) Also, the view modes may include a 2D view mode and a 3D view mode.

With this structure, it is possible to present beforehand, to the user, the switchability of view mode for viewing the video content between the 2D view mode and the 3D view mode, thereby to improve the user's convenience.

(9) An exemplary embodiment of the present invention provides a content playback method for use in a content playback device that includes a reception unit, a presentation unit, an input reception unit, and a request unit, the content playback method for playing back a video content while receiving the video content in a streaming format from a content distribution system that is connected with the content playback device via a network, the content playback method comprising: a reception step of, by the reception unit, receiving, from the content distribution system, control information indicating a plurality of view modes selectable for viewing the video content; a presentation step of, by the presentation unit, presenting, to a user of the content playback device, the view modes as options of a view mode for viewing the video content; an input reception step of, by the input reception unit, receiving an input selecting one view mode among the view modes from the user; and a request step of, by the request unit, requesting the content distribution system to distribute the video content in the streaming format, by transmitting information indicating the selected view mode to the content distribution system.

An exemplary embodiment of the present invention provides a content playback program for causing a computer to function as a content playback device that plays back a video content while receiving the video content in a streaming format from a content distribution system that is connected therewith via a network, the content playback program causing the computer to function as: a reception unit operable to receive, from the content distribution system, control information indicating a plurality of view modes selectable for viewing the video content; a presentation unit operable to present, to a user of the content playback device, the view modes as options of a view mode for viewing the video content; an input reception unit operable to receive an input selecting one view mode among the view modes from the user; and a request unit operable to request the content distribution system to distribute the video content in the streaming format, by transmitting information indicating the selected view mode to the content distribution system.

An exemplary embodiment of the present invention provides a content providing system that includes a content distribution system and a content playback device that are connected with each other, the content distribution system distributing a video content in a streaming format to the content playback device, the content playback device playing back the video content while receiving the video content in the streaming format from the content distribution system, the content distribution system comprising: a transmission unit operable to transmit, to the content playback device, control information indicating a plurality of view modes selectable for viewing the video content; a request reception unit operable to receive, from the content playback device, information indicating one view mode selected among the view modes; and a distribution unit operable to distribute the video content in the selected view mode to the content playback device, and the content playback device comprising: a reception unit operable to receive the control information from the content distribution system; a presentation unit operable to present, to a user, the view modes as options of a view mode for viewing the video content; an input reception unit operable to receive an input selecting the one view mode among the view modes from the user; and a request unit operable to transmit the information indicating the selected view mode to the content distribution system.

With this structure, it is possible to present beforehand, to the user, the switchability between the view modes to provide the user with an opportunity to switch between the view modes, thereby to improve the user's convenience.

INDUSTRIAL APPLICABILITY

The content playback device of the present disclosure presents to a user the switchability between a plurality of view modes for viewing a content to provide the user with an opportunity to switch between the view modes, and accordingly is useful for a device that plays back a content while receiving the content in a streaming format via a network.

REFERENCE SIGNS LIST

1: content providing system
2: content distribution system
3: playback device
4: playback device
5: network
11: portal server
12: playback control information server
13: video content server
81: communication processing unit
82: demultiplexer
83: audio decoder
84: video decoder
85: subtitle decoder
86: display processing unit
87: VOD playback control unit
88: browser processing unit
89: storage unit
90: user operation unit

The invention claimed is:

1. A content playback device that plays back a video content while receiving the video content in a streaming format from a content distribution system that is connected therewith via a network, the content playback device comprising:
a communication circuit;
a processor; and
a memory having stored thereon a computer program, wherein:
the communication circuit is operable to receive, from the content distribution system, control information indicating a plurality of view modes selectable for viewing the video content;
the processor executing the computer program functions as a presentation unit operable to present, to a user of the content playback device, the view modes as options of a view mode for viewing the video content;
the processor executing the computer program functions as an input reception unit operable to receive an input selecting one view mode among the view modes from the user; and
the communication circuit is operable to request the content distribution system to distribute the video content in the streaming format, by transmitting information indicating the selected view mode to the content distribution system, and wherein
in the case where, before the playback of the video content on the content playback device, the video content has been viewed by the user in a device other than the content playback device up to a certain point,
the content distribution system stores therein a view mode used for viewing the video content on the other device,
the communication circuit further receives, from the content distribution system, information indicating the view mode that has been used for viewing the video content in the other device, and
the presentation unit presents the view modes such that the view mode that has been used in the other device is distinguishable from any other of the view modes.

2. The content playback device of claim 1, wherein the view modes presented by the presentation unit do not include any view mode that is not supported by the content playback device.

3. The content playback device of claim 1, wherein the control information has written therein the view modes, each selectable as a view mode for viewing the video content, and
the presentation unit reads the view modes written in the control information, and displays the read view modes.

4. The content playback device of claim 3, wherein the control information is additionally contained in ERI (Entry Resource Information), and
the communication circuit receives the control information, by receiving the ERI from the content distribution system and extracting the control information from the ERI.

5. The content playback device of claim 1, wherein the view modes each support a different resolution.

6. The content playback device of claim 1, wherein the view modes include a 2D view mode and a 3D view mode.

7. A content playback method for use in a content playback device that includes a communication circuit, a processor, and a memory having stored thereon a computer program that, when executed by the processor, causes the processor to function as a presentation unit and an input reception unit, the content playback method for playing back a video content while receiving the video content in a streaming format from a content distribution system that is connected with the content playback device via a network, the content playback method comprising:
a reception step of, by the communication circuit, receiving, from the content distribution system, control information indicating a plurality of view modes selectable for viewing the video content;
a presentation step of, by the presentation unit, presenting, to a user of the content playback device, the view modes as options of a view mode for viewing the video content;
an input reception step of, by the input reception unit, receiving an input selecting one view mode among the view modes from the user; and
a request step of, by the communication circuit, requesting the content distribution system to distribute the video content in the streaming format, by transmitting information indicating the selected view mode to the content distribution system, wherein
in the case where, before the playback of the video content on the content playback device, the video content has been viewed by the user in a device other than the content playback device up to a certain point,
the content distribution system stores therein a view mode used for viewing the video content on the other device,
the reception step further comprises receiving, from the content distribution system, information indicating the view mode that has been used for viewing the video content in the other device, and the presentation step further comprises presenting the view modes such that the view mode that has been used in the other device is distinguishable from any other of the view modes.

8. A non-transitory computer-readable recording medium having stored therein a content playback program for causing a computer to function as a content playback device that plays back a video content while receiving the video content in a streaming format from a content distribution system that is connected therewith via a network, the content playback program causing the computer to:

receive, via a communication circuit, from the content distribution system, control information indicating a plurality of view modes selectable for viewing the video content;

function as a presentation unit operable to present, to a user of the content playback device, the view modes as options of a view mode for viewing the video content;

function as an input reception unit operable to receive an input selecting one view mode among the view modes from the user; and request, via the communication circuit, the content distribution system to distribute the video content in the streaming format, by transmitting information indicating the selected view mode to the content distribution system, wherein in the case where, before the playback of the video content on the content playback device, the video content has been viewed by the user in a device other than the content playback device up to a certain point, the content distribution system stores therein a view mode used for viewing the video content on the other device, the content playback program further causes the computer to receive, via the communication circuit, from the content distribution system, information indicating the view mode that has been used for viewing the video content in the other device, and the presentation unit is further operable to present the view modes such that the view mode that has been used in the other device is distinguishable from any other of the view modes.

9. A content providing system that includes a content distribution system and a content playback device that are connected with each other, the content distribution system distributing a video content in a streaming format to the content playback device, the content playback device playing back the video content while receiving the video content in the streaming format from the content distribution system, the content distribution system comprising:

a first communication circuit;
a first processor; and
a first memory having stored thereon a first computer program, wherein:

the first communication circuit is operable to transmit, to the content playback device, control information indicating a plurality of view modes selectable for viewing the video content;

the first communication circuit is operable to receive, from the content playback device, information indicating one view mode selected among the view modes; and the first processor executing the first computer program functions as a distribution unit operable to distribute the video content in the selected view mode to the content playback device, and the content playback device comprising:
a second communication circuit;
a second processor; and
a second memory having stored thereon a second computer program, wherein:

the second communication circuit is operable to receive the control information from the content distribution system;

the second processor executing the second program functions as a presentation unit operable to present, to a user, the view modes as options of a view mode for viewing the video content;

the second processor executing the second program functions as an input reception unit operable to receive an input selecting the one view mode among the view modes from the user; and the second communication circuit is operable to transmit the information indicating the selected view mode to the content distribution system, and wherein in the case where, before the playback of the video content on the content playback device, the video content has been viewed by the user in a device other than the content playback device up to a certain point, the content distribution system stores therein a view mode used for viewing the video content on the other device, the second communication circuit further receives, from the content distribution system, information indicating the view mode that has been used for viewing the video content in the other device, and the presentation unit presents the view modes such that the view mode that has been used in the other device is distinguishable from any other of the view modes.

* * * * *